(12) United States Patent
Thomas

(10) Patent No.: US 7,105,466 B2
(45) Date of Patent: *Sep. 12, 2006

(54) SILICEOUS CLAY SLURRY

(75) Inventor: Ronald J. Thomas, Paris, TN (US)

(73) Assignee: H.C. Spinks Clay Company, Inc., Paris, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/188,477

(22) Filed: Jul. 25, 2005

(65) Prior Publication Data

US 2005/0266978 A1 Dec. 1, 2005

Related U.S. Application Data

(63) Continuation-in-part of application No. 10/898,742, filed on Jul. 26, 2004.

(60) Provisional application No. 60/493,891, filed on Aug. 9, 2003.

(51) Int. Cl.
C04B 33/04 (2006.01)
C04B 33/28 (2006.01)

(52) U.S. Cl. ..................... 501/141; 501/144

(58) Field of Classification Search ................ 501/141, 501/143–149
See application file for complete search history.

(56) References Cited

U.S. PATENT DOCUMENTS

| | | | |
|---|---|---|---|
| 3,944,425 A | 3/1976 | Magder | |
| 4,024,412 A | 5/1977 | MacAskill, Jr. | |
| 4,144,084 A | 3/1979 | Abercrombie, Jr. | |
| 4,294,635 A | 10/1981 | Hurley, Jr. | |
| 4,317,849 A * | 3/1982 | Ogura et al. | 427/362 |
| 4,327,189 A | 4/1982 | Crutchfield | |
| 4,439,532 A | 3/1984 | Strother, Jr. | |
| 4,568,392 A | 2/1986 | Dawson | |
| 4,647,381 A | 3/1987 | Fong | |
| 4,647,832 A | 3/1987 | Fenne | |
| 4,741,838 A | 5/1988 | Sharpe, Jr. | |
| 4,781,298 A | 11/1988 | Hemstock | |
| 4,812,247 A | 3/1989 | Fahner | |
| 4,812,248 A | 3/1989 | Marwick | |
| 4,812,427 A | 3/1989 | Kohut | |
| 4,812,428 A | 3/1989 | Kohut | |
| 4,817,446 A | 4/1989 | Kanamori | |
| 4,832,890 A | 5/1989 | Sato | |
| 4,880,759 A | 11/1989 | Kohut | |
| 4,888,315 A * | 12/1989 | Bowman et al. | 501/144 |
| 4,915,890 A | 4/1990 | Koblinski | |
| 5,034,448 A | 7/1991 | Koblinski | |
| 5,036,599 A | 8/1991 | Thompson | |
| 5,096,733 A | 3/1992 | Vallyathan | |
| 5,153,155 A | 10/1992 | Kohut | |
| 5,204,628 A | 4/1993 | Konishi | |
| 5,223,463 A * | 6/1993 | Bilimoria et al. | 501/146 |
| 5,296,180 A | 3/1994 | Hayes | |
| 5,298,205 A | 3/1994 | Hayes | |
| 5,302,898 A | 4/1994 | Pethig | |
| 5,332,499 A | 7/1994 | Spencer | |
| 5,343,150 A | 8/1994 | Nakahata | |
| 5,362,692 A | 11/1994 | Bugajski | |
| 5,403,790 A | 4/1995 | Claar | |
| 5,403,793 A | 4/1995 | Tsuchiya | |
| 5,405,592 A | 4/1995 | Edler | |
| 5,433,372 A | 7/1995 | Mellul | |
| 5,458,837 A | 10/1995 | Roberts | |
| 5,512,829 A | 4/1996 | Holczer | |
| 5,558,690 A | 9/1996 | Hnat | |
| 5,562,765 A | 10/1996 | Brosnan | |
| 5,593,930 A | 1/1997 | Sato | |
| 5,705,118 A | 1/1998 | Hayes | |
| 5,707,912 A | 1/1998 | Lowe | |
| 5,730,836 A | 3/1998 | Greig | |
| 5,775,835 A | 7/1998 | Szekely | |
| 5,779,785 A | 7/1998 | Payton | |
| 5,935,885 A | 8/1999 | Hnat | |
| 6,171,506 B1 | 1/2001 | Allen | |
| 6,524,703 B1 | 2/2003 | Court | |
| 6,537,363 B1 | 3/2003 | Golley | |
| 6,696,377 B1 | 2/2004 | Thomas | |
| 6,741,077 B1 | 5/2004 | Yokoyama | |
| 6,800,242 B1 | 10/2004 | Cao | |
| 6,846,768 B1 | 1/2005 | Parker | |
| 2002/0109216 A1 | 8/2002 | Matsuzaki | |
| 2004/0116274 A1 | 6/2004 | Sare | |

FOREIGN PATENT DOCUMENTS

EP 0521470 A1 1/1993

OTHER PUBLICATIONS

Perry et al. eds., Chemical Engineers' Handbook, 1973, p. 7-4, 5th edition, McGraw-Hill, New York.
Perry et al. eds., Chemical Engineers' Handbook, 1973, pp. 21-39 to 21-44, 5th edition, McGraw-Hill, New York.
Perry et al. eds., Chemical Engineers' Handbook, 1973, pp. 21-44 to 21-45, 5th edition, McGraw-Hill, New York.

* cited by examiner

*Primary Examiner*—Karl Group
(74) *Attorney, Agent, or Firm*—Howard J. Greenwald

(57) ABSTRACT

A clay slurry with a solids content of at least about 60 weight percent and a casting rate of at least 60 grams per hour, wherein the slurry contains from about 68 to about 74 weight percent of silica and less than about 0.8 percent of carbon. At least about 9 weight percent of the particles in the slurry are larger than about 44 microns, and at least about 5 weight percent of the particles in said slurry are larger than about 74 microns.

92 Claims, 5 Drawing Sheets

SILICEOUS CLAY SLURRY

CROSS-REFERENCE TO RELATED PATENT APPLICATION

This patent application is a continuation-in-part of applicant's copending patent application U.S. Ser. No. 10/898,742, filed on Jul. 26, 2004. Priority for such Jul. 26, 2004 patent application was based upon provisional patent application U.S. Ser. No. 60/493,891, filed on Aug. 9, 2003. The entire disclosure of each of these United States patent applications is hereby incorporated by reference into this specification.

FIELD OF THE INVENTION

A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, and wherein the ratio of weight percent of said particles that are greater than about 75 microns to the weight percent of said particles that are greater than about 45 microns is from about 0.5 to about 0.7.

BACKGROUND OF THE INVENTION

U.S. Pat. Nos. 4,812,247 and 4,812,248 of William Kohut describe a stable ball clay slurry that contained from about 50 to about 65 weight percent (by weight of dry ball clay) of silica. In the "comparative examples" discussed in such patents (see, e.g., comparative examples 10–89 of U.S. Pat. No. 4,812,427, at columns 39 et seq.), a discussion was presented of certain slurries made from clays with a silica content of 72 weight percent. Referring to columns 43 and 44 of U.S. Pat. No. 4,812,427, and in the examples 16, 17, 18, and 19 thereof, slurries made from clays containing 72 weight percent of silica were unstable, having a settling index of 0.11, 0.18, 0.16, and 0.18, respectively. By comparison, the stable ball clay slurry of U.S. Pat. No. 4,812,427 had a settling index of at least 0.9; but the maximum allowable silica content for such slurry was 65 percent.

The slurry described in the Kohut patents was not adapted to be used as a slip for casting. In order to make a casting slip, one must add kaolin, feldspar and flint to such slurry. The flint component is primarily comprised of crystalline silica, an ingredient which certain manufacturers have, for a variety of reasons, preferred not to utilize in their manufacturing processes.

It is an object of this invention to provide a clay slurry that can be used to make a casting slip with excellent properties and performance without the need to mix silica with such clay slurry or slip. It is another object of this invention to make such a slurry with a silica content of from about 68 to about 74 percent.

It is another object of this invention to provide a casting slip with a settling index of at least 0.9.

It is yet another object of this invention to provide a casting slip whose viscosity properties are relatively stable, varying by less than about 5 percent over a period of 3 days.

It is another object of this invention to provide a casting slip whose viscosity properties vary less than about 5 percent over a period of 10 days.

It is yet another object of this invention to provide a casting slip that can be used to make a cast green body that, when fired, will have less than 0.5 percent absorption.

SUMMARY OF THE INVENTION

In accordance with this invention, there is provided a clay slurry with a solids content of from 57 about to about 75 weight percent and a casting rate of at least 60 grams per hour. The slurry contains from about 68 to about 74 weight percent of silica, from about 9 to about 30 weight percent of the particles in the slurry are larger than about 45 microns, and from about 5 to about 20 weight percent of the particles in the slurry are larger than about 75 microns. In one embodiment, the ratio of weight percent of said particles that are greater than about 75 microns to the weight percent of said particles that are greater than about 45 microns is from about 0.5 to about 0.7.

BRIEF DESCRIPTION OF THE DRAWINGS

The invention will be described by reference to the enclosed drawings, in which like numerals refer to like elements, and wherein.

DESCRIPTION OF THE PREFERRED EMBODIMENTS

Figure 1:
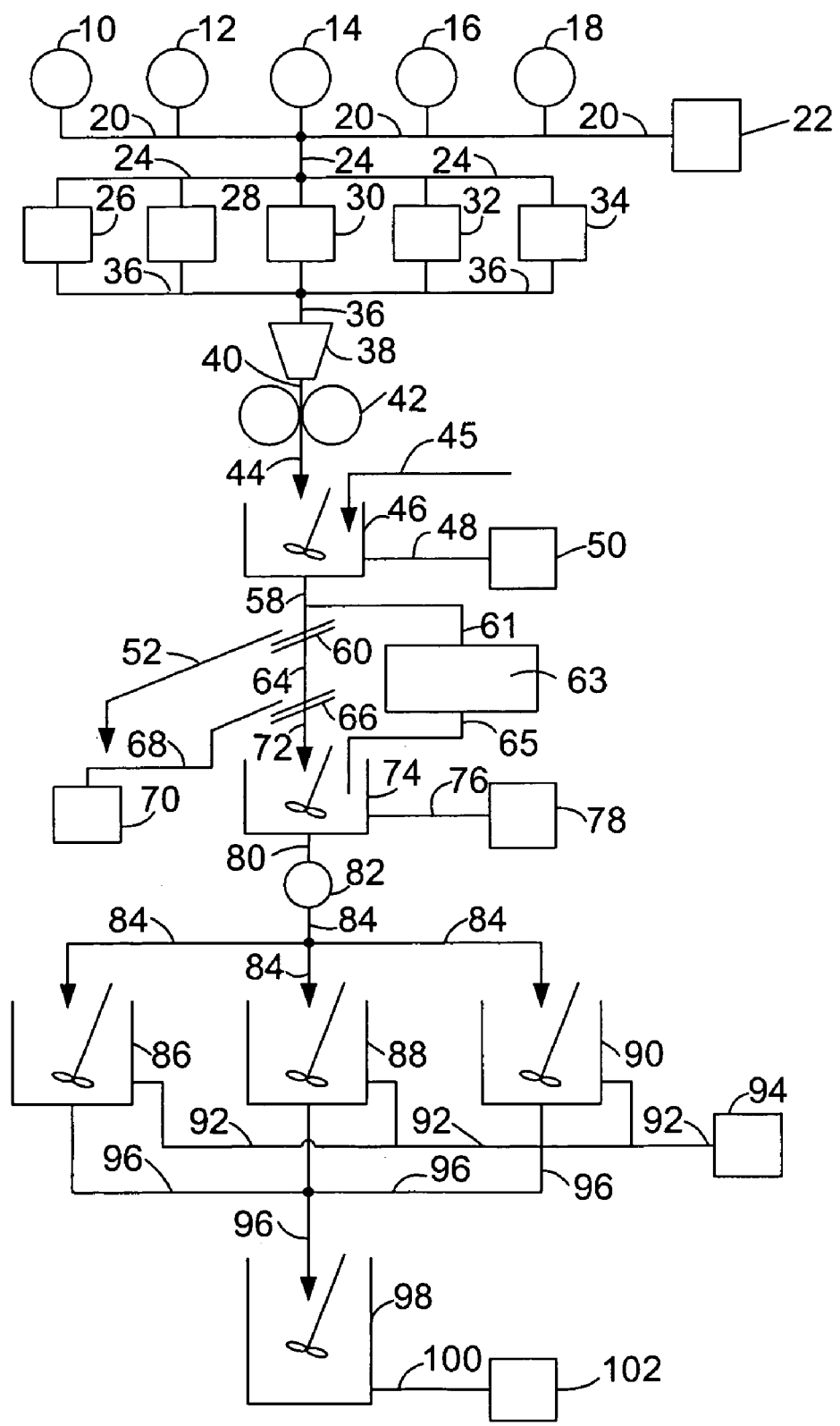
FIG. 1 is a flow diagram illustrating one preferred process of the invention.

In one embodiment, the slurry of this invention is stable, i.e., it does not settle appreciably. This property may be measured by using the "settling index" test described in U.S. Pat. No. 4,812,427, the entire disclosure of which is hereby incorporated by reference into this specification. As is disclosed in this patent, "This test is used to determine the stability of the slurry to resist the settling of particles out of suspension due to gravity. The gel structure developed in the slurry must be sufficient to prevent such settling. A high value of settling index means that very little setting has occurred. The settling index of the ball clay slurry is measured by a test in which a half-gallon sample of the slurry is first mixed for 2 minutes on a Lightning V-7 Mixer ("Lightning Mixer") which is manufactured by the Mixing Equipment Company of Rochester, N.Y. Thereafter, a sample of the mixed slurry is weighed out and put into a small aluminum container. The container is then placed in an oven set at 80 degrees Centigrade and allowed to dry for about 16 hours. The weight of the dried sample is then determined, and the initial solids content of the slurry is then calculated."

As is also disclosed in U.S. Pat. No. 4,812,427, "Thereafter, a half-gallon sample of the slurry is mixed for two minutes on the Lightning Mixer. A cylindrical polyvinyl chloride tube which is 11.0 inches long and has an inside diameter of 54.4 millimeters is used. The bottom portion of the tube is covered with a small cap and 600 ml. of slurry is poured into the tube. The tube is then sealed at the top with "Saran Wrap" to prevent evaporation. The filled tube is then placed upright in a 4.0" deep water in a "Blue M Magni Whirl Constant Temperature Bath" (manufactured by the Blue M Electric Company of Blue Island, Ill.); the apparatus is set at a temperature of 35 degrees centigrade with a four second pulse duration and frequency. The tube of slurry is then allowed to settle undisturbed in the bath for 10 days. After ten days in the bath, the tube of slurry is removed from the bath and placed upright in a conventional freezer for about 16 hours. Thereafter, it is removed from the freezer and rotated under a stream of hot water to slightly melt the outer surface of the slurry so that the cap can be removed and the slurry pushed out of the tube. The cylinder of slurry removed from the tube is sampled—a one inch sample is cut off from each of the top and the bottom of the sample using a common backsaw. Each of the one-inch samples is then placed in separate 400 milliliter beakers of known weights. Each of the filled beakers is weighed, placed in an oven set at 80 degrees centigrade and allowed to dry for 16 hours. The weight of each of the one-inch samples is then calculated from this data. The settling index is equal to the solids content of the top one-inch sample (in percent) divided by the solids content of the bottom one-inch sample (in percent)."

As is also disclosed in U.S. Pat. No. 4,812,427, "A settling index of 1.0 indicates the same solids content on top and bottom, i.e., no settling has occurred."

In one embodiment, the settling index of the siliceous slurry of this invention is at least about 0.9.

The slurry of this invention preferably has a solids content of from about 57 to about 75 weight percent and, preferably, from about 60 to about 65 weight percent. One may measure the solids content of a slurry by conventional means such as, e.g., the means disclosed in U.S. Pat. Nos. 4,812,427 and 4,812,428, the entire disclosure of each of which is hereby incorporated by reference into this specification. Thus, by way of illustration and not limitation, one may measure the specific gravity of the slurry and thereafter calculate the solids content of the slurry based upon the average density of the particles in the slurry; in the case of ball clay slurries (and also kaolin slurries), the particle density is often about 2.60 grams per cubic centimeter. By way of further illustration, reference may be had, e.g., to U.S. Pat. No. 4,144,084 (method of controlling the viscosity of dispersed clay slurries); U.S. Pat. No. 4,741,838 (high solids mineral slurries); U.S. Pat. Nos. 4,647,832; 4,781,298 (high solids content clay slurries); U.S. Pat. No. 5,036,599 (slurried kaolin); U.S. Pat. Nos. 5,707,912; 5,730,836 (evaporative concentration of clay slurries); U.S. Pat. No. 5,779,785 (smectite slurries); U.S. Pat. Nos. 6,171,506; 6,537,363; and the like. The entire disclosure of each of these United States patents is hereby incorporated by reference into this specification.

In one embodiment, the solids content of the slurry is from about 60 to about 63 percent.

The slurry of this invention preferably has a casting rate of at least about 60 grams per hour and, more preferably, from about 80 to about 120 grams per hour. The casting rate of the slurry may be determined by conventional means such as, e.g., the means disclosed at column 15 of U.S. Pat. No. 4,812,427, the entire disclosure of which is hereby incorporated by reference into this specification. "As is disclosed in such column 15, " The casting rate of the ball clay slurry is determined by a test in which a 300 cubic centimeter sample of the slurry, at a solids content of 60 dry weight percent of slurry, is filter pressed through a Whatman 2.5 micron No. 5 filter paper with 98 percent retention above 2.5 microns in an NL Baroid Series 300 Standard API Filter Press (manufactured by NL Industries of Houston, Tex.) at 30 pounds per square inch for 60 minutes, the filter press is then drained for five minutes, and the filter cake is weighed. The casting ratio is equal to the number of grams (wet weight) in the filter cake after 60 minutes." It is preferred, when determining the casting rate for the instant invention, that a pressure of 90 pounds per square inch (rather than 30 pounds per square inch) be used for 60 minutes.

In one preferred embodiment, the slurry of this invention is comprised of at least about 68 weight percent of silica, dry weight, by dry weight of total solids in the slurry; in one aspect of this embodiment, the concentration of silica is from about 68 to about 74 weight percent, by dry weight of solids. The concentration of silica in the slurry may be determined by conventional means such as, e.g., the means described in U.S. Pat. No. 4,812,427, the entire disclosure of which is hereby incorporated by reference into this specification. As is disclosed, e.g., at column 8 of this patent, "The silica content of the ball clay is determined by standard elemental oxide analysis for clays, using atomic absorption analysis; the test described in the 'Alumina content of the ball clay' definition is equally applicable here. This silica content includes that fraction within the mineralogical structure of the clay minerals themselves as well as the free quartz minerals associated with the ball clays." At the same column 8 of this patent, the test for determining the alumina content of the clay is defined as follows: "The amount of alumina in the ball clay is determined by atomic absorption analysis, using the Perkin-Elmer Model 2380 Atomic Absorption Spectrophotometer, manufactured by the Perkin-Elmer Corporation of Norwalk, Conn. National Bureau of Standards clay standards SRM 98a and 99a are used, and the test is conducted in substantial accordance with the manual for model 2380 entitled "Analytical Methods for Atomic Absorption Spectrophotometry. In order to put the ball clay into solution for the atomic absorption analysis, a fusion method is used. In this fusion method, the following steps are involved: 1. 0.1 grams of oven-dried clay are placed in a 25 ml. platinum crucible with its cover. 0.5 grams of lithium metaborate are added to the clay and mixed with it with a small glass or polypropylene rod until the mixture is relatively homogeneous. Thereafter, the mixture is fused at 1000 degrees centigrade for from about 10 to about 15 minutes. . . . 2. The crucible is then removed from the oven and allowed to air cool to below red heat. The bottom of the crucible is then quickly quenched in distilled water. The fusion is inspected to insure that there are no signs of pieces of fired clay and that the entire mass is clear. . . . 3. The crucible is then place din a 100 ml. tall beaker. To this is added 60 ml. of hot water, the magnetic stirring bar is dropped in, and stirring is begun. Either 2 ml. of nitric acid or 5 ml. of concentrated hydrochloric acid is added. If nitric acid is used, the solution will remain clear. If hydrochloric acid is used, the solution may have a slightly yellow color. . . . 4. The placement of the magnetic stirring bar may have to be altered several times to effect dissolution of the fusion in the side of the crucible. Dissolution should be complete in about 15 minutes."

It is preferred that the slurry contain from about 68 to about 74 weight percent of silica, by weight of dry ball clay. In one embodiment, the slurry contains at least about 70 weight percent of silica. In another embodiment, the slurry contains at least about 72 weight percent of silica.

In one embodiment, the slurry of this invention contains from about 14 to about 21 weight percent of alumina. In one aspect of this embodiment, the ratio of silica to alumina, weight percent/weight percent, is at least about 3.2 and, more preferably, at least about 4.0.

In one embodiment, the slurry of this invention contains less than about 0.8 weight percent of carbon, by total dry weight of solids; in one aspect of this embodiment, the slurry contains less than about 0.7 weight percent of carbon. Means for measuring carbon in a slurry are well known and are described, e.g., in U.S. Pat. Nos. 4,024,412; 4,327,189; 4,568,392; 4,647,381 (high solids mineral slurries); U.S. Pat. No. 5,433,372 (stable high solids slurries); U.S. Pat. No. 6,696,377 (clay slurry); and the like. The entire disclosure of each of these United States patents is hereby incorporated by reference into this specification.

In one embodiment, a sample of the slurry is dried at a temperature of 100 degrees Celsius until it has a moisture content of less 0.2 weight percent. Thereafter, from about 0.2 to about 0.5 grams of the dried solid material is preferably tested for carbon content in a Leco SC-444 carbon/sulfur analyzer (manufactured by the Leco Corporation of 3000 Lakeview Avenue, St. Joseph, Mich. 49085) using a temperature of 1,450 degrees Celsius in an atmosphere of oxygen.

In one preferred embodiment, the carbon content of the slurry, as measured as described above, is less than about 0.6 weight percent.

In one preferred embodiment, the slurry has a particle size distribution such that at least 9 percent of the particles in such slurry are larger than about 45 microns, and at least 5 percent of the particles in such slurry are larger than about 75 microns. The particle size distribution of such slurry may be measured, e.g., in accordance with the procedure described at column 10 of U.S. Pat. No. 4,812,427, the entire disclosure of which is hereby incorporated by reference into this specification. Thus, and referring to such column 10, "The particle size distribution of the ball clay can be measured in accordance with the following methods: 1. In view of the manner in which clay particles fracture, clay particles will have irregular shapes which, however, are of a body (or maximum side-to-side thickness) such that sub-sieve sized discrete particles will pass through a specified mesh of a sieve. The size of the discrete particles can be expressed in terms of a spherical diameter through which a clay particle from a sample of clay or clay/water slurry will pass. One can use U.S. Series sieves down to about 270 mesh or 53 microns. 2. A Micromeritics Sedigraph Model 5000ET (made by the Micromeritics Company, Norcross, Ga. may be used to measure the particle size distribution of the clay material in the ball clay/water slurry. A 0.3 percent solution of "Lomar D" (the sodium salt of a condensed mono naphthalene sulfonic acid sold by Diamond Shamrock Chemical Company of Morristown, N.J.) can be used. The Lomar D solution is made by weighing 3.0 grams of Lomar D and placing it in a one-liter flask; the flask is then filled up to the mark with distilled water. Approximately 4 grams (dry weight) of ball clay is placed in 50 milliliters of the dilute Lomar D solution and mixed in an English microcup for ten minutes. The slurry is then cooled to 32 degrees Celsius and pumped into the Sedigraph for analysis. 3. Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for this machine (see, e.g., Manual P/N: 230/42804/00, published by Micromeritics in 1985). 4. Wet sieve analysis of ball clay may be conducted in accordance with A.S.T.M. test C-325-81." As will be apparent, other analytical means also may be used for this and other purposes. Reference may be had, e.g., John P. Sibilia's "A Guide to Materials Characterization and Chemical Analysis" (VCH Publishers, Inc., New York, N.Y., 1998). Reference may also be had to John A. Dean's "Analytical Chemistry Handbook (McGraw-Hill, Inc., New York, N.Y., 1995). Reference also may be had, e.g., to T. Allen's "Particle Size Measurement" (Chapman and Hall, London, 1981).

In one preferred embodiment, from about 9 to about 30 weight percent of the particles in the slurry are larger than 45 microns, and from about 5 to about 20 weight percent of such particles are larger than about 75 microns; in one aspect of this embodiment, the ratio of the weight percent of the particles that are greater than 75 microns to the weight percent of the particles that are greater than 45 microns is from about 0.5 to about 0.7 and, more preferably, from about 0.53 to about 0.68. In another embodiment, such ratio is from about 0.55 to about 0.60.

In one preferred embodiment, the slurry of this invention has a loss upon ignition (LOI) of from about 6.0 to about 7.7 percent. In another embodiment, the slurry of this invention has a loss on ignition of less than about 7.1 percent. Loss on ignition may be determined by conventional means such as, e.g., the means described in U.S. Pat. No. 4,812,427. Thus, e.g., one may use standard A.S.T.M. test C323-56 (1995, reapproved in 1999), "Test Methods for Chemical Analysis of Ceramic Whiteware Clays" (see section 8).

In one embodiment, the slurry of this invention contains less than about 10 weight percent of fractured silica. In another embodiment, the slurry contains less than about 5 weight percent of fractured silica, by total weight, dry basis, of the solids in the slurry. In yet another embodiment, the slurry contains less than about 1 weight percent of fractured silica. In yet another embodiment, the slurry contains less than about 0.1 weight percent of fractured silica.

The term "fractured silica" is well known to those skilled in the art. Reference may be had, e.g., to U.S. Pat. Nos. 5,096,733 and 5,403,793, to published patent application US 20020109216, and to European patent publication EP0521470. The entire disclosure of each of these patent publications is hereby incorporated by reference into this specification.

Fractured silica is discussed, e.g., in U.S. Pat. No. 5,096,733, the entire disclosure of which is hereby incorporated by reference into this specification. As is disclosed in this United States patent, "Studies have suggested that freshly fractured silica may exhibit surface reactivity not found in aged silica. Hochstrasser and Antinini (7) reported that silicon-based radicals could be generated upon cleavage of a quartz crystal under ultra-high vacuum ($10^{-10}$ mm Hg). Karmanova and colleagues (8) reported release of singlet oxygen from silica dust upon heating, whereas Kolbanev and associates (9) reported generation of $H_2O_2$ from the reaction of freshly ground silica with water. In addition, Marasas and Harington (10) reported that silica exhibits oxidant properties that may be related to its pathogenicity." In support of these statements, the patentees cite articles by G. Hochstrasser et al., "Surface states of pristine silica surfaces (Surface Sci, 1972: 644–646), by E. V. Karmanova et al. ("Mechanism of the emission of singlet oxygen molecules from a disordered quartz surface, "Zhurnal Fizichestoi Khimii, 58: 1958–1961, 1984), and by L. W. Marass et al. ("Some oxidative and hydroxylative action of quartz . . . " Nature, 188:1173–1174, 1960)."

Reference may also be had, e.g., to an article by B. Fubini entitled "Surface Reactivity in the Pathogenic Response to Particulates," "Environmental Health Perspectives '05, Supplement 5, September 1997 (http://ehp.niehs.nih.gov/members.). This article discusses the interaction of aluminum with the silica surface of clays.

Referring again to U.S. Pat. No. 5,096,733, which describes and claims "fractured silica," it is disclosed in this patent that: "Vallyathan et al (Am. Rev. Respir. Dis., 138: 1213–1219 (1988)) have reported that freshly fractured silica exhibits surface characteristics and biological reactivity distinct from aged silica, that grinding of silica produced ~$10^{18}$ Si and Si—O (silicon based radicals per gram of dust) on the particulate surface, which were characterized by an electron spin resonance (ESR) spectrum centered around g=2.0015, and that these radicals react with aqueous media to produce OH radicals (demonstrated using a DMPO spin trap); that when compared to aged silica, freshly ground silica exhibits a greater cytotoxic effect on cellular membrane integrity (i.e., it showed a 1.5-fold increase in lactate dehydrogenase (LDH) release from macrophages, a 36-fold increase in hemolytic activity, and a 3-fold increase in the ability to induce lipid peroxidation as compared with aged silica)."

In one embodiment of this invention, the slurry of this invention contains less than about 10 weight percent of silica that contains about " . . . $10^{18}$ Si and Si—O silicon based radicals per gram of dust . . . " In another embodiment of this invention, the slurry contains less than about 5 weight percent of silica that about " . . . $10^{18}$ Si and Si—O silicon based radicals per gram of dust. . . ." In yet another embodiment of this invention, the slurry contains less than about 1 weight percent silica that contains about " . . . $10^{18}$ Si and Si—O silicon based radicals per gram of dust. . . ."

Without wishing to be bound to any particular theory or theories, applicant believes that the silica contained in the process and composition of this invention, as contradistinguished from "fractured silica," has a lower surface activity as evidenced by electron spin resonance spectra. It is believed that such electron spin resonance analyses will indicate that the "fractured silica" has a higher surface reactivity than the silica contained in this invention, and lower levels of surface-based radicals on the silica.

As used in this specification, electron spin resonance spectra is a visual display, photograph or graphical plot of the intensity of electrons emitted from a substance bombarded by radiation as a function of the kinetic energy of the electrons. McGraw-Hill's Dictionary of Scientific and Technical Terms (Fourth Edition, 1989) edited by Sybil P. Parker at p. 629, defines electron spin resonance as "electron paramagnetic resonance," further defined as "magnetic resonance arising from the magnetic moment of unpaired electrons in a paramagnetic substance or in a paramagnetic center in a diamagnetic substance. Abbreviated EPR. Also known as electron spin resonance (ESR); paramagnetic resonance." Electron spin resonance may be measured according to the teachings of U.S. Pat. No. 6,741,077 (Electron spin resonance measurement method and measurement device for measuring ESR within the interior of large samples). The entire disclosure of said patent is incorporated by reference into this specification. Claim 1 of U.S. Pat. No. 6,741,077 claims 1. A method of measuring electron spin resonance (ESR) in an interior of a large sample located outside a resonator, the method comprising: positioning sample outside a resonator below a plane including the end of the resonator; generating an alternating magnetic field ($B_1$) from the end of the resonator to the exterior of the resonator; detecting the generated alternating magnetic field; and measuring the electron spin resonance of the interior of the large sample using the alternating magnetic field.

Alternatively, electron spin resonance may be measured with the apparatus and according to the teachings of U.S. Pat. No. 5,302,898 (Electron spin resonance spectrometers). The entire disclosure of said patent is incorporated by reference into this specification. Claim 1 of U.S. Pat. No. 5,302,898 claims 1. An electron spin resonance spectrometer for measuring free-radical resonance of a material comprising: (1) a material-receiving cavity positioned between poles of a permanent magnet; (2) means for applying microwave energy having a frequency to the cavity; (3) electromagnetic means for measuring the frequency of the microwave energy applied to the cavity and which in conjunction with the permanent magnet provides a magnetic field of variable strength to the cavity; (4) means for adjusting the strength of the magnetic field in the cavity; (5) means for detecting changes in the microwave energy which is reflected from the cavity; (6) means for analyzing the changes detected in the microwave energy reflected from the cavity; (7) a sample-receiving reference cell positioned between the poles of the permanent magnet and parallel to the material-receiving cavity; (8) means for measuring a nuclear magnetic resonance frequency of a sample present in the reference cell; (9) means for calculating from the nuclear magnetic resonance frequency measured the magnetic field to be provided by the permanent magnet to the cavity and the reference cell; and (10) means for applying the magnetic field as calculated by the means for calculating the magnetic field to control the strength of the magnetic field provided by the permanent magnet.

Claim 7 of U.S. Pat. No. 5,302,898 claims

7. A method of operating an electron spin resonance spectrometer comprising: (1) locating a cavity between poles of a permanent magnet; (2) applying microwave energy having a frequency to the cavity; (3) locating a microwave signal which is reflected back from the cavity; (4) mixing the microwave signal with an output signal of a local oscillator to generate a signal at an intermediate frequency; (5) controlling the strength of the magnetic field in the cavity, thereby providing a magnetic field of variable strength, by applying an additional electromagnetic field to the cavity in accordance with the frequency of the signal at an intermediate frequency; (6) continuously measuring the strength of the magnetic field in the cavity, and (7) varying the strength of the magnetic field by use of a programmed microprocessor to maintain a constant relationship between the strength of the magnetic field and the cavity's resonance frequency.

Reference is also made to U.S. Pat. No. 5,204,628 (electron spin resonance system), U.S. Pat. No. 5,343,150 (Apparatus and method for measuring a physical property of a sample using an electron spin resonance spectrum of the sample) and U.S. Pat. No. 5,512,829 (Method of measuring pulsed electron spin resonance signals and pulsed electron spin resonance spectrometer). The entire disclosures of said patents are incorporated by reference into this specification.

In one embodiment, the slurry of this invention is comprised of silica, at least 90 weight percent of which contains less than about $10^{17}$ Si and Si—O silicon based radicals per gram. In another embodiment, the slurry of this invention is comprised of silica, at least 90 weight percent of which contains less than about $10^{16}$ Si and Si—O silicon based radicals per gram.

Another Slurry of this Invention

In the preceding section of this specification, applicant has described one particular siliceous slurry with a particular set of properties. In this section of the specification, applicant will describe another such slurry that differs from the first slurry.

The slurry of this embodiment of the invention is comprised of from about 65 to about 75 weight percent of solids, from about 54 to about 63 weight percent of silica, and less than about 0.4 weight percent of carbon; it has a settling index of at least 0.7 and a specific surface area of from about 8 to about 14 square meters per gram; and the ratio of silica to alumina in the slurry is from about 1.5 to about 1.9. Of the silica in the slurry, less than about 2 weight percent of it (by dry weight) is a silica selected from the group consisting of fractured silica, processed silica, and mixtures thereof.

The slurry of this embodiment of the invention also contains liquid and solids. The liquid is preferably an aqueous liquid, i.e., it is comprised of or consists essentially of water. In general, the liquid is comprised of at least about at least about 80 volume percent of water and, more preferably at least 90 volume percent of water. Other liquid components may be present in a minor amount (i.e., less than 20 volume percent), such as, e.g., poly(vinyl alcohol), glycerine, stearic acids, etc. These additives may be present as lubricants, or additives that change the surface tension of the liquid phase, as modifiers of the rheology of slurry, and the like.

In one embodiment, the other liquid component is an organic liquid.

In one preferred embodiment, the liquid used in the slurry is compatible with mold plaster such that, during slip casting, the passage of the liquid through the plaster mold does not substantially degrade the pores of the mold. In one aspect of this embodiment, the liquid is substantially inert with respect to the plaster and thus, as it is drawn through the pores in the plaster mold, tends not to degrade such pores. To this end, one of the components of the liquid phase of the slurry is preferably adapted to interfere with reaction between such liquid phase and the plaster.

In general, the slurry will preferably contain from about 65 to about 75 weight percent of solids (by total weight of solids and liquid in the slurry). In one embodiment, the slurry contains from about 69 to about 73 weight percent of solids.

The slurry preferably will have a settling index of at least about 0.7 and, preferably, at least about 0.75.

The slurry preferably contains from about 54 to about 63 weight percent of silica. In one embodiment, the slurry contains from about 54 to about 58 weight percent of silica.

The slurry preferably has a ratio of silica to alumina of from about 1.5 to about 1.9.

It is preferred that the carbon content of the slurry be less than about 0.4 weight percent. In one embodiment, the carbon content of the slurry is less than about 0.3 weight percent.

The slurry of this embodiment of the invention preferably has a specific surface area of from about 8 to about 14 square meters per gram. The specific surface area may be measured by means well known to those skilled in the art. Reference may be had, e.g., to U.S. Pat. No. 5,153,155, the entire disclosure of which is hereby incorporated by reference into this specification. As is disclosed in this patent, "Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for the machine (see, e.g., Manual P/N: 230/42804/00, published by Micromeritics in 1985)."

One Preferred Process for Making Applicant's Slurry

In the process illustrated in FIG. 1, a preferred process for preparing one embodiment of applicant's clay slurry is disclosed, in which the slurry is a ball clay slurry. This Figure is similar to the FIG. 1 of U.S. Pat. No. 4,880,759, the entire disclosure of which is hereby incorporated by reference into this specification.

Ball clays, as mined, are very heterogeneous in those properties crucial to the production of a consistent ball clay slurry, from top to bottom and laterally throughout the mineral deposit. Thus, a single clay cannot readily produce ball clay slurry with consistent properties. Several deposits, or several locations within a single deposit, may be required to make ball clay slurries. For the purposes of this specification, each ball clay sample which displays unique properties is considered to be a separate ball clay, even if it came from the same deposit.

In one embodiment, applicant's preferred ball clay slurry is preferably blended, i.e., it is prepared by mixing two or more ball clays so that, to some extent, a blend is obtained in which the separate identify of the consists of two or more of the ball clays is lost. Thus, when two or more ball clay slurries are mixed, a blended slurry in which substantially only one ball clay consist exists is produced. Thus, e.g., the same result may be obtained when two ball clays are combined by dry mixing, or when ball clay is mixed with ball clay slurry. In one embodiment, siliceous kaolin slurries are also made by a comparable process. For such siliceous kaolin slurries, one may blend sandy kaolin clays with coarse silica fractions comparable the coarse silica fractions used in the siliceous ball clays described elsewhere in this specification.

Prior to the time the ball clay (or the kaolin clay) is mixed with water and chemical(s), the properties of candidate clay(s) are preferably evaluated. Thus, for example, in one embodiment, at least two ball clays to be used from deposits 10 and/or 12 and/or 14 and/or 16 and/or 18 are sent first to lab 22 where specific properties are measured. In this embodiment, the ball clay is multicomponent, that is, it contains at least two ball clay consists. The slurry may be prepared, e.g., by mixing two ball clays and then adding liquid, by blending two ball clay-water mixtures, by mixing a ball clay with a ball clay slurry, and the like. In one preferred embodiment, described below, at least two ball clays are admixed before they are mixed with water. Such a blending process is illustrated, e.g., in U.S. Pat. No. 4,812,427, the entire disclosure of which is hereby incorporated by reference into this specification.

The measurements made upon the clays from deposits 10, 12, 14, 16, or 18 may include (1) chemical analysis, (2) particle size distribution, (3) pH of the clay, measured by a conventional pH meter, (4) deflocculation potential (measured by the deflocculation test described in U.S. Pat. No. 4,880,759) to determine how much defloculant will bring it to minimum viscosity, (5) dry modulus of rupture of the clay, (6) fired color of the clay, which is determined by visual means, (7) specific surface area of the clay, and (8) other properties of the clay, such as soluble sulfate content and the amount of digesting agent to be added.

By way of illustration and not limitation, the amount of silica present in the ball clay also often is determined.

In one preferred embodiment, a 600 gram sample of ball clay from at least two of the deposits 10, 12, 14, 16, or 18 is tested in lab 22 to determine how much digesting agent should be added to the slurry. This test (the transmission test) is described in U.S. Pat. No. 4,880,759. It should be noted that, in the digestion of the ball clay, one may use alkali metal hydroxide (such as, e.g., sodium hydroxide or potassium hydroxide) instead of soda ash to digest the clay.

The soluble sulfate content of the ball clays to be used can be determined from A.S.T.M. test C-867-77. If the soluble sulfate content exceeds the amount required in the slurry, the sulfate content can easily be reduced by adding, e.g., barium carbonate in stoichiometric proportions. Thus, for example, 2.05 pounds of barium carbonate must be added for each pound of sulfate ion one wishes to retire from the slurry.

These preliminary evaluations may be used to determine which storage shed(s) the clays should be sent to. Such analysis allows one to determine, for any given desired slurry with specified properties which, if any, ball clays to blend and how much, if any, of each ball clay should be blended. Because accurate sampling of large, dry, bulk quantities is difficult, such analysis only gives starting approximations of the final product.

After being analyzed in laboratory 22, clay from two or more of deposits 10, 12, 14, 16, and 18 are charged via line 24 to one or more of storage sheds 26, 28, 30, 32, and 34, according to the specifications of earlier material already stored in the shed(s).

In the description from this point on, the preparation process described refers to a method of making a ball clay-water slurry from clay contained in a hopper containing at least two ball clays. It is to be understood, however, that the same process could be used to prepare slurry from clay contained in a hopper containing only one ball clay. In the preferred embodiment, the ball clay slurry is multi-component, that is, it is prepared from at lest two ball clay consists, i.e., at least two ball clays with different particle size distributions.

In the process of this invention, and in one preferred embodiment thereof, it is preferred to utilize one or more ball clays that are "unprocessed." As used in this specification, the term "unprocessed" refers to a ball clay (or other material) which has not been subjected to a temperature of at least about 200 degrees Fahrenheit.

Referring again to FIG. 1, clay from one or more of storage sheds 26, 28, 30, 32, and/or 34 is fed via line 36 to weigh hopper 38 and thence, via line 40, to roller-crusher 42. Feeding means well known to those skilled in the art can be used to convey the clay from the storage shed. Thus, e.g., one can use any of the conveying and/or feeding means described on page 7-4 of R. H. Perry and C. H. Chilton's "Chemical Engineer's Handbook," Fifth Edition, McGraw-Hill Book Company (New York, 1973) to convey the clay from the storage shed to weigh hopper 38 and roller crusher 42.

It is preferred, in one embodiment, that roller-crusher 42 reduce the lump size of the clay such that substantially all of the lumps of clay are 1.5 inches or finer.

As used in this specification, the term "hopper" refers to a vessel into which materials are fed, which usually is constructed in the form of an inverted pyramid or cone terminating in an opening through which the materials are discharged. Any of the hoppers known to those skilled in the art can be used in the process of this invention.

The clay to be used in the process is weighed, and a suitable amount of clay is fed so that 55,000 pounds of clay (dry basis) are in weigh hopper 38.

The clay from crusher 42 is fed via line 44 to blunger 46. As is used in this specification, the term "blunger" refers to a cylindrical vessel containing a rotating shaft with fixed knives useful for blunging. Blunging is the process of blending or suspending ceramic material in liquid by deagglomeration and agitation.

In one embodiment of the process of this invention, hot water, digesting agent, organic polyelectrolyte, sulfate adjusting agent, pH adjusting agent, and other desired chemical additives are added to blunger 46 via line 45. It is preferred that these reagents be fed into the blunger in a certain sequence. The organic polyelectrolyte used in the process is preferably not fed into the blunger until at least about 50 percent of the clay has been fed into the blunger and all of the digesting agent to be used has been added. Furthermore, if the soluble sulfate content of the ball clay is too high, it is preferred that the organic polyelectrolyte not be fed into blunger 46 until the soluble sulfate ion concentration has been reduced to the required level.

In one embodiment, some or all of the organic polyacrylate is replaced by an inorganic dispersing agent, such as sodium silicate.

A sufficient amount of water is fed into blunger 46 via line 45 so that, when the water has been mixed with all of the clay from hopper 38, a clay/water slurry with the required solids content will be produced. It is preferred that the water be hot, that it be at a temperature of from about 140 to about 200 degrees Fahrenheit. It is even more preferred that the water be at a temperature of from about 150 to about 190 degrees Fahrenheit. In an even more preferred embodiment, the water is at a temperature of from about 160 to about 180 degrees Fahrenheit. In the most preferred embodiment, the water is at a temperature of from about 165 to about 175 degrees Fahrenheit.

The required amount of digesting agent, if any, as determined by the test described in U.S. Pat. No. 4,880,759, is added to blunger 46 via line 45. Alternatively, or additionally, some or all of the digesting agent can be added with the water through line 45. In either event, it is preferred that the digesting agent and any sulfate adjusting agent used be added to blunger 46 in the form of aqueous solutions. In general, from about 0.0 to 0.1 percent, by weight of dry clay, of digesting agent is used in the process of the invention.

In one embodiment, it is preferred that all of the digesting agent required in the process be mixed with water in blunger 46 before any of the ball clay is charged to the blunger. Furthermore, it is preferred that at least half of the ball clay to be used in the process be mixed with water and the digesting agent prior to the time the organic polyelectrolyte is added to the blunger.

If the ball clay used in the process contains more than about 650 parts per million of soluble sulfate ion, then the clay may be mixed with a sulfate reducing agent prior to the time the polyelectrolyte (or sodium silicate) is added. The sulfate reducing agents that can be used include barium carbonate, barium monohydrate, barium octahydrate, mixtures thereof, and the like. The amount of sulfate reducing agent can be determined by stoichiometric calculation.

The ball clay from crusher 42 is fed into blunger 46 over a period of from 25 to about 120 minutes. It is preferred to feed the clay into the blunger over a period of from about 35 to about 90 minutes. In a more preferred embodiment, the clay is fed into the blunger over a period of from about 40 to about 60 minutes.

In one embodiment, organic polyelectrolyte and/or sodium silicate is fed into blunger 46 only after two things have occurred: (1) at least about 50 percent of the ball clay from hopper 38 has been fed into blunger 46, and (2) the mixture in blunger 46 becomes too viscous to effectively agitate.

During blunging, clay/water mixture from the bottom of blunger 46 is fed via line 52 to dump 70 for disposal.

In one embodiment, when the viscosity of the mixture in blunger 46 exceeds about 8,000 centipoise, then organic polyelectrolyte and/or sodium silicate is added to the blunger, condition (2) having occurred; this addition reduces the viscosity, and blunging and/or clay addition is continued until the viscosity again exceeds about 8,000 centipoise. The process is continued until all 55,000 pounds of the ball clay are blunged and the final viscosity of the mixture is about 200 centipoise or less at about 60 percent solids content.

If the Gallenkamp build-up is too high, and/or the Brookfield viscosity at 100 r.p.m. is too high, more organic (or inorganic) polyelectrolyte is added to the blunger. When the slurry in blunger 46 has the desired viscosity, solids content, and Gallenkamp build-up, as measured in laboratory 50, in one embodiment the slurry may be discharged via line 58 to scalper screen 60.

Scalper screen 60 is preferably a 30 mesh screen which removes oversize particles. Other suitable screens can be used to remove particles greater than about 600 microns. Thus, e.g., one can use any of the screening devices shown on pages 21–39 to 21–44 of the Perry and Chilton "Chemical Engineers' Handbook."

Slurry passing through scalper screen 60 may be passed via line 64 to finishing screen 66. Finishing screen 66 is preferably a 100 mesh screen which removes all particles greater than 150 microns. The oversize from screen 66 usually contains coarse particles of undesirable sand and lignite, which material is transferred via line 68 to dump 70 for disposal.

Although only one scalper screen 60 and only one finishing screen 66 are shown in FIG. 1, a multiplicity of such screens can be used. Thus, in one embodiment, two scalper screens 60 and five finishing screens 66 are used.

In another embodiment, also illustrated in FIG. 1, an alternative screening apparatus 63 is used. This alternative screening apparatus is preferably a Spencer Strainer System sold by the Spencer Machine and Tool Company of Jeffersonville, Ind. and described, e.g., in U.S. Pat. No. 5,332,499. The entire disclosure of such United States patent is hereby incorporated by reference into this specification.

U.S. Pat. No. 5,332,499 discloses and claims: "A self-cleaning filter for removing solid particles from a liquid slurry comprising agglomerates of solid particles, the self-cleaning filter comprising: a casing having an inlet for receiving material to be filtered and an outlet for discharging filtered material; a tubular filter screen disposed in the casing and having a length, a circumference, an exterior surface and an interior surface, the tubular filter screen being rotatable in a direction and forming an inlet chamber between the casing and the exterior surface in flow communication with the casing inlet and an outlet chamber within the interior surface in flow communication with the casing outlet, so that the slurry is filtered from the exterior surface of the tubular filter screen to the interior surface; first means for breaking-up a first portion of agglomerates deposited on the exterior surface of the tubular filter screen, forcing a first portion of the solid particles through the tubular filter screen, and suspending in the slurry a second portion of agglomerates deposited on the tubular filter screen, the first means comprising a first cleaning blade disposed in the inlet chamber and removably fixed to the casing, the first cleaning blade (1) having a leading edge biased against the exterior surface of the filter screen, (2) extending from a first blade holder toward the leading edge of the, first cleaning blade in a direction substantially opposing the direction of rotation of the tubular filter screen, and (3) extending along the length of the filter screen; a second means for catching and breaking-up the second portion of agglomerates and forcing a second portion of solid particles through the tubular filter screen, the second means comprising a second cleaning blade disposed in the inlet chamber and removably fixed to the casing, the second cleaning blade (1) having a leading edge biased against the exterior surface of the filter screen, (2) extending from a second blade holder toward the leading edge of the second cleaning blade in a direction substantially opposing the direction of rotation of the tubular filter screen, and (3) extending along the length of the filter screen, the second cleaning blade being spaced from the first cleaning blade at a position about the circumference of the tubular filter screen from about 75° to about 115° from the first cleaning blade; and means for rotating the tubular filter screen relative to the first and second cleaning blades."

Referring again to FIG. 1, the slurry from blunger 46 may be passed via line 61 to screening apparatus 63, and the screened slurry produced in such apparatus may then be fed via line 65 into surge tank 74.

Alternatively or additionally, the slurry which passes through finishing screen 66 may be fed via line 72 into surge tank 74. Samples of slurry are taken via line 76 to lab 78 for evaluation of specific properties. This slurry can later be blended with other ball clay/water slurries to obtain desired final blend properties. The specific properties evaluated in lab 78 are described below and are:

Specific Gravity—The specific gravity of the slurry, in one embodiment, should be from about 1.585 to about 1.684.

Gallenkamp Build-Up—It is preferred that the build-up be from about 65 to about 100 degrees.

Casting Rate—The casting rate should be from about 60 to about 160 grams in one hour.

In one embodiment, the screening of the slurry should be adequate to produce a slurry with the specific surface area particle size distribution discussed below.

In one embodiment, the specific surface area of the slurry is less than about 16 square meters per gram. In one aspect of this embodiment, such specific surface area is from about 14 to about 15.4 square meters per gram. In another aspect of this embodiment, such specific surface area is from about 16 to about 19 square meter per gram.

In one embodiment, from about 27 to about 51 percent of the particles in the slurry are smaller than 1 micron.

In one embodiment, from about 36 to about 60 percent of the particles in the slurry are smaller than 2 microns.

In one embodiment, from about 48 to about 72 percent of the particles in the slurry are smaller than 5 microns.

In one embodiment, from about 53 to about 82 percent of the particles in the slurry are smaller than 10 microns.

It is preferred also to conduct analyses of slurry particles greater than 45 microns by conventional sieve analyses, as is described at pages 21–44 to 21–45 of Robert H. Perry et al.'s "Chemical Engineer's Handbook," Fifth Edition (McGraw-Hill Book Company, New York, N.Y., 1973). It is preferred to use a Ro-Tap testing sieve shaker (see FIG. 21–56 of the Perry et al. text) manufactured by the W.S. Tyler Company. In utilizing the test procedure, it is preferred to use certain U.S. Standard sieve series, to wit: 80 mesh, 120 mesh, 170 mesh, 230 mesh, and 325 mesh, which corresponds to, respectively, opening sizes of 180 microns, 125 microns, 90 microns, 63 microns, and 45 microns.

It is preferred that the screening be conducted so that the slurry have one or more of the particle size distributions described below.

In one embodiment, at least about 98 percent of the particles in the slurry percent of the particles in the slurry are smaller than 180 microns.

In one embodiment, at least about 90 percent of the particles in the slurry are smaller than 125 microns.

In one embodiment, at least about 83 percent of the particles in the slurry are smaller than 90 microns.

In one embodiment, at least about 75 percent of the particles in the slurry are smaller than 63 microns.

In one embodiment, at least about 68 percent of the particles in the slurry are smaller than 45 microns.

A Preferred Blending Process

In this section of the specification, by way of illustration only and not limitation, applicant presents one preferred blending process for preparing three siliceous slurries of the invention.

Figure 2:
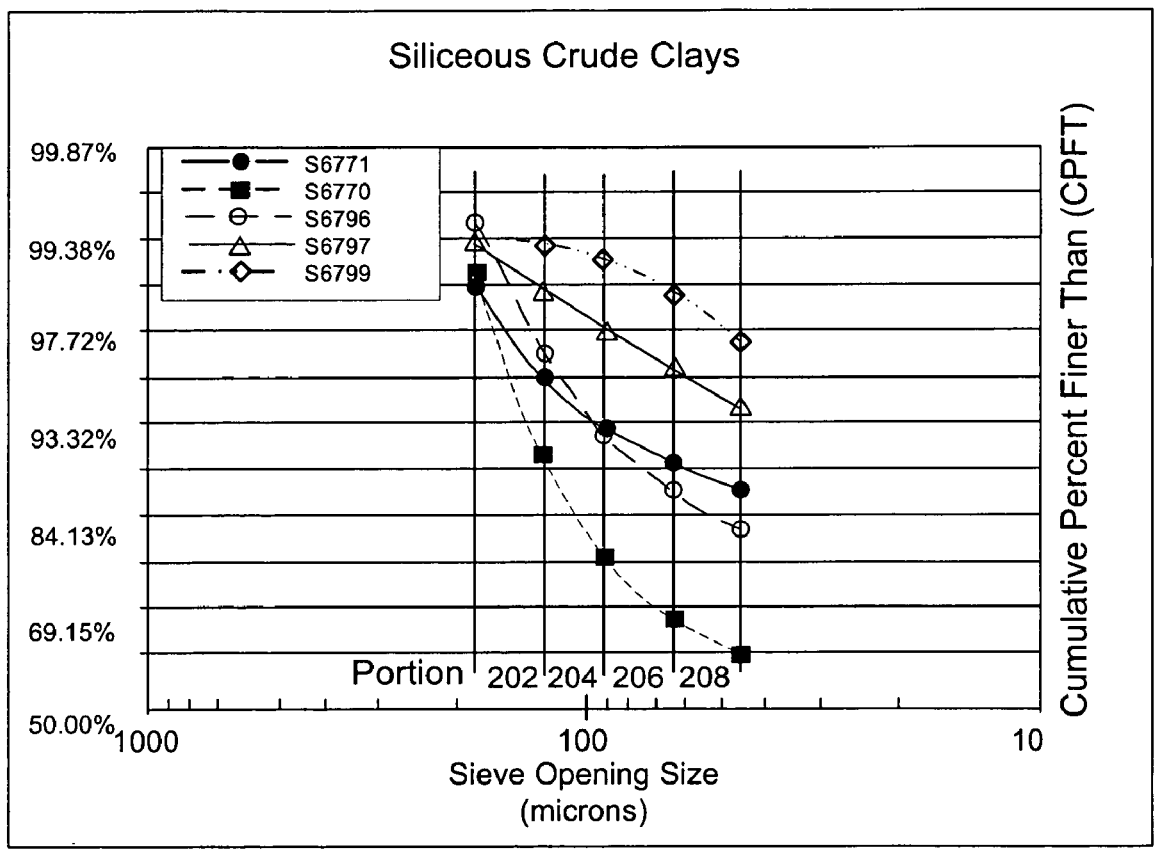
FIG. 2 is a "CPFT" graph of five different crude clays with different particle size distributions.

FIG. 2 describes the particle size distributions of five (5) different clays identified as S6771, S6770, S6796, S6797, and S6799. This FIG. 2 is a plot of CPFT ("cumulative percent finer than, in terms of solids) versus particle size (in microns). The plot was made using log (for the particle size) versus normal (for the CPFT plot), in accordance with the well-known binomial probability equation (see, e.g., Example 1 of U.S. Pat. No. 4,817,446, the entire disclosure of which is hereby incorporated by reference into this specification.). The plots depicted in FIG. 2 are from particle sizes ranging from 180 microns to microns.

For each of the plots for each of said different clays, it will be seen that a portion 202 of the curve extends from 180 microns to 125 microns, a portion 204 of the curve extends from 125 microns to 90 microns, a portion 206 of the curve extends from 90 microns to 63 microns, a portion 208 of the curves extends from about 63 microns to about 45 microns.

Figure 3:
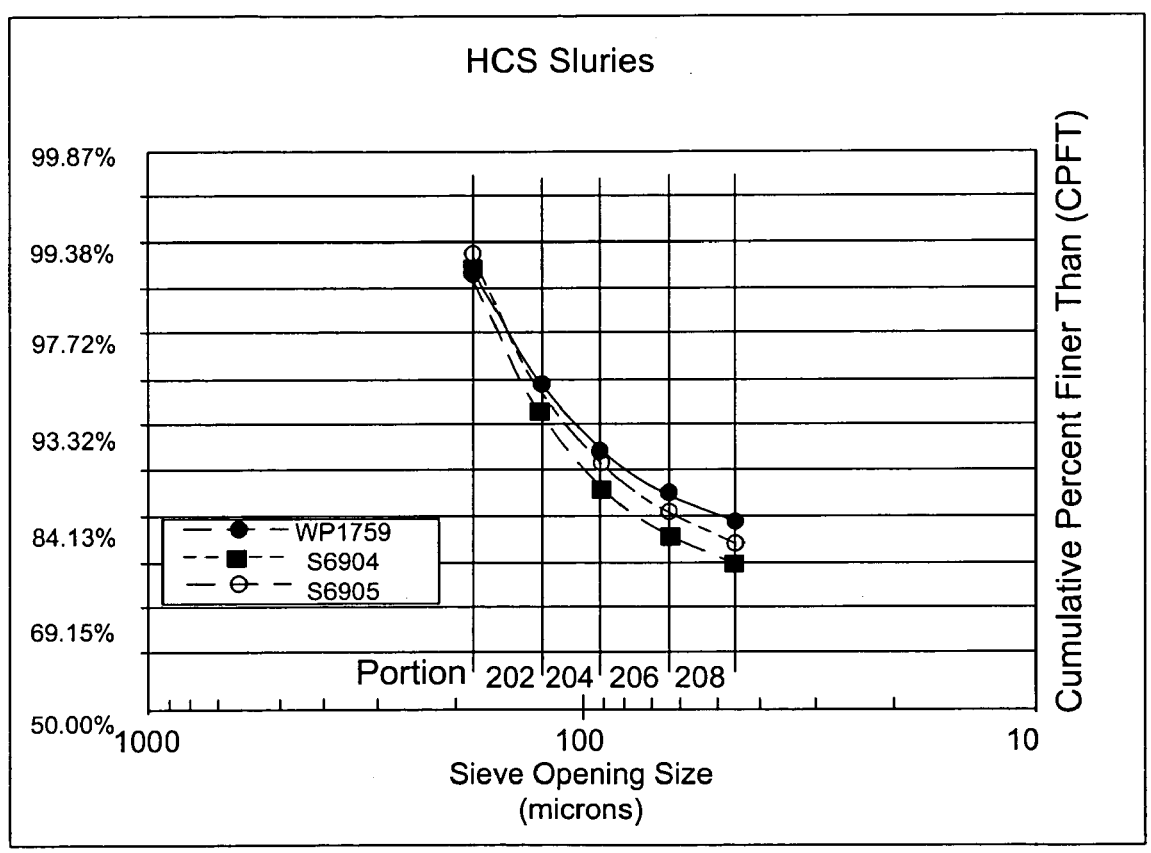
FIG. 3 is a "CPFT" graph of three different slurries made by blending one or more of the clays of FIG. 2.

FIG. 3 is "CPFT graph" of slurries WP1759, S6904, and S6905, showing their plots for such portions 202, 204, 206, and 208.

The WP1759 slurry was prepared by blending 25 weight percent of the S6771 clay, 25 weight percent of the S6770 clay, 30 weight percent of the S6797 clay, and 20 weight percent of the S6799 clay. The S6799 clay was "digested" with sodium carbonate in accordance with the process described elsewhere in this specification prior to the time it was blended with the other clays. This slurry contained 0.035 weight percent (dry weight) of soda ash, and 0.293 weight percent (dry weight) of sodium silicate.

The S6904 slurry was prepared by blending 40 weight percent of the S6771 clay, 40 weight percent of the S6770 clay, and 20 weight percent of the S6799 clay. The S6799 clay was "digested" with sodium carbonate in accordance with the process described elsewhere in this specification prior to the time it was blended with the other clays. This slurry contained 0.034 weight percent (dry weight) of soda ash, and 0.276 weight percent (dry weight) of sodium silicate.

The S6905 slurry was prepared by blending 30 weight percent of the S6770 clay, 25 weight percent of the 6796 clay, 25 weight percent of the S6797 clay, and 20 weight percent of the S6799 clay. The S6799 clay was "digested" with sodium carbonate in accordance with the process described elsewhere in this specification prior to the time it was blended with the other clays. This slurry contained 0.034 weight percent (dry weight) of soda ash, and 0.285 weight percent (dry weight) of sodium silicate.

As will be appreciated by those skilled in the art, the data presented is only illustrative of three particular slurries; and other slurries within the scope of the invention may have different configurations.

In one embodiment, the slope each of the portions 202, 204, 206, and 208, for each separate plot, are within about plus or minus 10 percent of the slopes for each of such other portions, in which case one is able to draw a substantially straight line form the 180 micron point to the 45 micron point.

Referring again to FIG. 1, and to the preferred embodiment depicted therein, the slurry from surge tank 74 is preferably passed via line 80 through electromagnetic filter 82 to remove magnetic particles from the slurry. The slurry is then passed via line 84 to one of agitated storage tanks 86, 88 or 90.

The slurry of this invention can be prepared from different clays with different properties using the process of FIG. 1, and some or all of the slurries can then be blended to produce a slurry with final properties. For example, a single clay from storage shed 18 may finally be placed in the slurry tank 90. Tanks 86 and 88 may contain slurries with different properties, from different sheds, all determined in lab 78. Based on these properties, the specific proportions from 86, 88, and 90 may be blended via line 96 and volumetric pump (not shown) into final storage tank 98. The specific additional properties measured in lab 94 are:

a. Particle Size Distribution—The CPFT at 5 microns, 2 microns, and 1 micron are determined from the Sedimentometry Analysis described in U.S. Pat. No. 4,880,759.

b. Specific Surface Area—The S.S.A. of the solid fraction of the slurry is measured as described in U.S. Pat. No. 4,880,759.

c. Sieve Analysis is conducted as discussed elsewhere in this specification.

Using these data, and the data from lab 78, in a linear optimization program the final properties of the blended slurry are predicted. The final slurry is then blended from tanks 86, 88, and 90 and passed via line 96 into final slurry tank 98. Final evaluation of all pertinent properties is then repeated in lab 102.

Properties of One Preferred Ball Clay/Water Slurry

The ball clay/water slurry of this invention, in one embodiment, is preferably prepared from at least two other ball clay/water slurries. In one embodiment, the slurry is prepared by blending at least three ball clay/water slurries; this embodiment is illustrated in the Examples of U.S. Pat. No. 4,880,759.

In order to be able to consistently obtain a ball clay slurry with the unique and rather specific combination of properties possessed by applicant's slurry, the wet blending of at least two ball clay slurries is preferred.

In one embodiment, the ball clay slurry of this invention comprises from about 58 to about 68 percent (by total weight of slurry) of ball clay (dry basis) and from about 42 to about 32 percent (by total weight of slurry) of water. It is preferred that the slurry contain from about 60 to about 66 percent (by weight of slurry) of ball clay and from about 40 to about 34 weight percent of water. In a more preferred embodiment, the slurry contains from about 63 to about 64.5 percent by weight, of ball clay, and from about 37 to about 35.5 percent, by weight, of water.

Unless otherwise specified in this case, the weight of ball clay in the slurry is on a substantially moisture-free ("dry") basis. Clay material is considered to be "dry" when it has substantially zero percent moisture. A 500 gram sample of ball clay which is dried at 105 degrees Centigrade. for 12 hours is considered to be "dry" for the purposes of this specification. As is well known to those skilled in the art, larger samples of ball clay will require longer drying times and/or higher temperatures.

If the solids content of the ball clay/water slurry is outside of the desired range, the viscosity stability and/or the particle stability and/or the flow rate of the slurry will often be unacceptable.

In one embodiment, ball clay slurry of this invention is comprised of from about 0.001 to about 1.0 percent of organic polyelectrolyte, calculated on the weight of the active ingredient in the polyelectrolyte by the weight of the dry ball clay in the slurry. It is preferred that the slurry comprise from about 0.01 to about 0.5 percent of organic polyelectrolyte and, more preferably, from about 0.1 to about 0.4 percent of said polyelectrolyte. In the most preferred embodiment, the slurry is comprised of from about 0.15 to about 0.3 percent of organic polyelectrolyte.

The organic polyelectrolyte used in the slurry of this embodiment of the invention preferably has a molecular weight of from about 1,400 to about 6,000 and, preferably, from about 2,300 to about 4,300. In a more preferred embodiment, the molecular weight is from about 3,000 to about 3,800. In the most preferred embodiment, the molecular weight is from about 3,300 to about 3,500.

The molecular weight of the organic polyelectrolyte may be determined by means well known to those skilled in the art. Thus, by way of illustration and not limitation, the molecular weight may be determined by gel permeation chromatography instrumentation operated in a size exclusion separation function. Suitable apparatus includes, e.g., a Perkin Elmer HPLC system.

It is preferred that the organic polyelectrolyte used in the slurry of this invention have at least one site on each recurring structural unit which, when the polyelectrolyte is in aqueous solution, provides an electrical charge. In one embodiment, the organic polyelectrolyte has at least two such sites per recurring unit.

It is preferred that the organic polyelectrolyte be a polymeric polycarboxylate, as is described in U.S. Pat. No. 4,880,759.

In one embodiment, some or all of the organic polyelectrolyte is replaced by inorganic dispersing agent, such as, e.g., sodium silicate.

In one embodiment, in addition to containing the organic polyelectrolyte, the ball clay slurry may additionally, or alternatively contain from about 0.1 to about 7.0 percent, by weight of dry ball clay, or at least one humic substance selected from the group consisting of humic acid, humate, and mixtures thereof. It is preferred that the slurry contain from about 0.3 to about 3.0 percent of said humic substance. In an more preferred embodiment, the slurry contains from about 0.5 to about 2.5 percent of said humic substance.

In one preferred embodiment, the preferred humic substance is a metal humate selected from the group consisting of sodium humate, potassium humate, ammonium humate, calcium humate, and mixtures thereof.

In one embodiment, the humic substance(s) is provided to the ball clay slurry by the digestion of digestible organic matter. In another embodiment, the humic substance(s) is provided to the slurry by the addition of said substance to the slurry.

If the humic substance(s) is to be provided to the ball clay slurry by digestion, one can use the digestible organic matter test to determine how much digesting agent should be added to the slurry. This test is different from the determination of the organic content in the ball clay. The test determines if the organic matter is digestible and, thus, is useful to the slurry properties. In this test, 600 grams of the ball clay are mixed with 400 grams of hot water, which is at a temperature of at least 150 degrees Fahrenheit. To this mixture is then added a 20 weight percent solution of soda ash; this solution is added in ten-drop increments. After each ten-drop increment of the soda ash has been added to the mixture, the mixture is stirred for two minutes with a Lightning Model V-7 Mixer ("Lightning Mixer") which is manufactured by the Mixing Equipment Company of Rochester, N.Y.; the viscosity of the stirred mixture is then determined on a Brookfield viscometer equipped with a number 3 spindle operated at 100 revolutions per minute; and the transmission of the stirred slurry is determined in accordance with the transmission test described elsewhere in this specification.

If the viscosity decreases from a first to a later incremental sample, or if the transmission decreases, then the ball clay being tested contains digestible organic matter. In general, it is desired that the transmission of the slurry filtrate not be below about 70 percent, although a slurry whose transmission is at least about 60 percent sometimes is suitable for certain purposes. Thus, when the addition of the digesting agent (such as soda ash) finally results in a slurry whose transmission is below the required level, one knows that maximum amount of the particular digesting agent which can be used in the process: the total amount of digesting agent which will give minimum viscosity without reducing the transmission below the required level should be used to digest the ball clay.

If the ball clay to be used in the process does not contain from about 0.1 to about 7.0 percent, by weight of dry clay, of digestible organic matter, one or more commercially available digested organic materials can be mixed with the clay, water, and polyelectrolyte. Thus, by way of illustration, one can add from about 0.1 to about 7.0 percent of "Supertreat" and/or "Carbonox" and/or other similar substances. These humic substances have variable high molecular weights. Without wishing to be bound to any particular theory, applicant believes that they serve as auxiliary dispersant when converted to the alkali form. It is possible that small quantities of other high molecular weight dispersants may be substituted as similar substances.

Those skilled in the art are well aware of the various humic substances which are commercially available. Thus, e.g., "Supertreat" is sold by the American Colloid Company of Skokie, Ill. Thus, e.g., "Carbonox" is sold by N. L. Industries of Highstown, N.J.

In one alternative embodiment, described in applicant's patent application U.S. Pat. No. 6,696,377 (the entire disclosure of which is hereby incorporated by reference), there is disclosed a process in which a digested lignite material is added to the blunger.

The process claimed in U.S. Pat. No. 6,696,377 involves a process for preparing a ball clay slurry with a casting rate of at least about 50, a modulus of rupture of at least 500 pounds per square inch, and from about 0.1 to about 1.0 weight percent of organic polyelectrolyte.

In the process of U.S. Pat. No. 6,696,377, the following steps are involved: (a) mixing water and lignite to produce a lignite and water mixture, wherein from about 3 to about 4 weight percent of said lignite, by weight of said water, is mixed with said water; (b) adjusting the pH of said lignite and water mixture with a pH adjusting material until said pH is at least about 9; (c) mixing said lignite and water mixture with lignitic coarse ball clay, thereby producing a mixture of lignitic coarse ball clay, lignite, and water, wherein: i. said lignitic coarse ball clay is comprised of from about 20 to about 40 weight percent of particles finer than about 0.5 microns and has a specific surface area of from about 13 to about 18 square meters per gram, and ii. said lignitic coarse ball clay is comprised of from about 1 to about 5 weight percent of organic matter, (d) adding to said mixture of lignitic coarse ball clay, lignite, and water, additional materials including organic polyelectroylate, non-lignitic coarse clay, and lignitic fine clay, thereby forming a blunge mixture, wherein: i. said mixture contains from about 15 to about 25 weight percent of said lignitic coarse ball clay, from about 25 to about 40 weight percent of said non-lignitic coarse clay, and from about 40 to about 50 weight percent of said lignitic fine ball clay, by total weight of said lignitic coarse ball clay, said non-lignitic coarse ball clay, and said lignitic fine ball clay, ii. said non-lignitic coarse ball clay has a specific surface area of from about 13 to about 18 square meters per gram, iii. said lignitic fine ball clay is comprised of from about 50 to about 70 weight percent of particles finer than 0.5 microns, and it has a specific surface area of from about 20 to about 35 square meters per gram, and iv. from about 0.1 to about 0.26 weight percent of organic polyelectrolyte (weight of active ingredient by total dry weight of said lignitic coarse ball clay, non-lignitic coarse ball clay, and lignitic fine ball clay) is added to said mixture of lignitic coarse ball clay, non-lignitic coarse ball clay, lignitic fine ball clay, lignite and water; and (e) mixing said blunge mixture for at least about 30 minutes." As will be apparent to those skilled in the art, one or more of the features of U.S. Pat. No. 6,696,377 may be incorporated into the process of the instant invention.

In one embodiment, the slurry of this invention is comprised of from about 50 to about 650 parts per million (by weight of dry ball clay) of flocculating ions. Some of the flocculating anions which may be used include, e.g., sulfate ion, carbonate ion, chloride ion, and mixtures thereof.

In one embodiment, these flocculating anions are accompanied by the cations of the various soluble salts which commonly are found in clay deposits. The most common dissolved salt found is gypsum or calcium sulfate. These flocculants both hinder and enhance slurry properties. In excess, they prevent proper deflocculation to the targeted low viscosity. In correct concentrations, they react with the polymeric polyelectrolytes to provide the correct gelation. Measurement of the flocculant cations is extremely difficult. Measurement of the accompanying molar equivalent of anion, such as sulfate, is relatively simple.

In one preferred embodiment, the flocculating ion is soluble sulfate ion. In this embodiment, it is preferred that the ball clay slurry comprise from about 250 to about 550 parts per million (by weight of dry ball clay) of soluble sulfate ion. In another embodiment, the ball clay slurry comprises from about 300 to about 400 parts per million of soluble sulfate ion.

If the level of soluble sulfate ion in the slurry is too high, one may blend the slurry with another slurry so that the blended slurry has the required concentration of soluble sulfate ion. Alternatively, or additionally, one can add soluble sulfate ion reducing agent(s) to the slurry. Thus, e.g., one can add such agents as barium carbonate, hydroxides of barium, mixtures thereof, and the like. Alternatively, one can dry blend several clays to modify the soluble sulfate level, and then blend the clay mixture with liquid to produce the slurry.

If the level of soluble sulfate ion in the slurry is too low, one may blend the slurry with another slurry so that the blended slurry has the required concentration of soluble sulfate ion. Alternatively, or additionally, one can add soluble sulfate increasing agents such as, e.g., calcium sulfate, sodium sulfate, aluminum sulfate, mixtures thereof, and the like. In addition, one may also use dry blending to produce a clay mixture with the required soluble sulfate content.

In one embodiment, the ball clay/water slurry described above, in addition to containing organic polyelectrolyte, may also contain one or more inorganic electrolytes. Suitable inorganic electrolytes are well known to those skilled in the art. Thus, by way one may use electrolytes such as sodium silicate, sodium hexametaphosphate, tetra sodium pyrophosphate, and the like.

From about 0.001 to about 1.0 weight percent of the inorganic electrolyte (by dry weight of clay, dry basis) may be present in the slurry, in addition to the 0.001 to about 1.0 weight percent of organic polyelectrolyte. In this embodiment, it is preferred that the slurry comprise from about 0.01 to about 0.5 weight percent of inorganic electrolyte and from about 0.001 to about 0.5 weight percent of said organic polyelectrolyte. When the amounts of organic polyelectrolyte and inorganic electrolyte are combined, the total amount of these ingredients is equal to a concentration of from about 0.01 to about 1.0 weight percent (by weight of dry ball clay, dry basis).

The weight/weight ratio of organic polyelectrolyte/inorganic electrolyte in the slurry, in one embodiment, is preferably from about 0.001 to about 999. In one embodiment, it is preferred that said weight/weight ratio be from about 0.01 to about 99. In this embodiment, it is more preferred that the weight/weight ratio be from about 0.05 to about 10 and, preferably, from about 0.1 to about 6.0. In a more preferred embodiment, said ratio is from about 0.2 to about 4.0. In an even more preferred embodiment, said weight/weight ratio is from about 0.33 to about 3.0. In another embodiment, said ratio is from about 0.5 to about 2.0.

Sodium silicate is one preferred inorganic electrolyte. As is known to those skilled in the art, such sodium silicate is readily available. Thus, as is disclosed on pages 460–461 of D. J. De Renzo's "Ceramic Raw Materials," (Noyes Data Corporation, Park Ridge, N.J., 1987), sodium silicate may be obtained from Cometals, Inc. (of One Penn Plaza, Suite 4901, New York, N.Y. 10019), from ICD Group, Inc (641 Lexington Avenue, New York, N.Y., 10022), or from other suppliers well known to those skilled in the art.

Preparation of a Casting Slip

In one embodiment of this invention, applicant discusses a novel casting slip. Prior to such discussion, applicant will present some background material from U.S. Pat. No. 4,880,759, the entire disclosure of which is hereby incorporated by reference into this specification. This background material was written by James E. Funk, formerly a Professor at Alfred University.

As is disclosed in column 1 of U.S. Pat. No. 4,880,759, "Ceramics is sometimes referred to as the second oldest profession known to man. Early man left his written records on tablets of clay. The Hebrew Exodus resulted partly from labor problems at Pharoah's Clay Works. Pre-Columbian potters produced food vessels and utensils. Chinese porcelains graced the tables of European nobility. Until the present century, however, the production of ceramic articles from clay-based compositions was mostly an art rather than a science. During this century the use of clays has been expanded within ceramics and beyond, to coatings for paper as well as fillers for plastic and rubber products. Even today many producers of complicated ceramics still rely on imperfect and often incorrect knowledge of this technology. However, the science has advanced to the point where the properties of clay-water slurries may now be accurately and consistently controlled to assure performance of the materials in the various manufacturing applications."

U.S. Pat. No. 4,880,759 also discloses that "Clay has the unique ability to impart plastic properties to a ceramic article due to its crystal structure which immobilizes a layer of water adsorbed onto its surfaces. In ceramic applications of clay-water slurries, there are a multitude of properties which must be synergistically controlled in order to assure the consistent performance of the slurry in any specific application. For the purpose of this text the explanation of the properties' synergism will be limited to perhaps its most difficult application: slip casting. Other applications, such as preparation of bodies for extrusion of electrical porcelain or dinnerware, or for spray drying, require a similar approach but with different parameters."

U.S. Pat. No. 4,880,759 also discloses that "A casting slip for sanitaryware casting is usually comprised of the following six ingredients.
1. Ball Clay—This provides kaolinite and other minor minerals as the smallest size particles in the body, including the major portion of the colloidal fraction of the assembled particle size distribution. The colloidal matter provides the high surface area necessary to react with the dispersant chemistry and impart plasticity to the green body and high mechanical strength to the dry body. It is the major contributor to the slip rheology, which is a critical measure of process control. Ball clays sometime contain organic matter, which may be converted to alkali humates and thereby provide autodispersion of the clay in water. The rheology of the ball clay, slurry portion almost alone determines the rheology of the final casting slip. Its natural chemistry and mineralogy also provide important firing and fired properties to the ceramic article.
2. Kaolin—This provides a slightly coarser fraction of kaolinite minerals to the body, modifying the particle size distribution and the behavior of the ball clay. It is more uniform in its crystallography and properties than ball clay, but it is otherwise quite similar to it. It usually fires whiter than ball clay.
3. Feldspar—This is an alkali-alumino-silicate mineral which is used to control the vitrification of the ceramic article during the final firing process.
4. Flint or Silica—This mineral is called a filler, and it further modifies the combined contributions of all of the other ingredients. It also limits the mechanical strength of the ceramic. . . . These four powders in combination also provide a particle size distribution and specific surface area of the solid fraction of a slip."

U.S. Pat. No. 4,880,759 also discloses that "5. Water—This provides the vehicle in which the particles of the above four powders are suspended. Water quality is important; the water should not contain an excess of multivalent cations as salts, such as calcium or magnesium. 6. Chemical Additives—They modify the rheology of the slurry and the slip. Monovalent alkali salts, at low concentrations, disperse or deflocculate the particles, reducing the viscosity. Multivalent cationic salts flocculate the particles increasing the viscosity. Formerly these salts were always of the inorganic types. More recently polymeric polyelectrolytes of various types have begun to be used for these purposes."

In column 2 of U.S. Pat. No. 4,880,759, it is disclosed that "Slip casting is the process whereby a low viscosity, high solids slip is dewatered in a plaster mold. However, this dewatering must be accompanied by a simultaneous gelation of the colloidal fraction of the particles within the body. These two processes, dewatering and gelation, are both necessary and, in some slips, are frequently opposed to each other. They perform separate functions and, only when balanced in exactly the correct relationship, do they together provide optimum casting behavior."

"DEWATERING If a casting slip contains a minimum of colloidal particles and sufficient dispersant to prevent any gelation due to flocculation to occur, the casting rate will depend only upon the thickness of the cast cake at the mold face. As the cast cake thickness increases, the pressure drop across the cake also increases, due to the increased resistance of the longer capillaries, thereby reducing the rate at which the cake continues to thicken. A plot of cast thickness vs. the square root of time will be a straight line with its slope being a measure of the uniform permeability of the cast cake. The equation describing this behavior is of the form: $L=(kT)m'$ wherein (1) L is the thickness of the cast cake, (2) T is the time of cast, (3) k is a constant containing pressure drop, viscosity of the water, porosity of the solid consist, and the density of the particles and slurry, and (4) m is approximately 0.5."

In the section beginning at the last paragraph of column 2 of U.S. Pat. No. 4,880,759, it is disclosed that "A conventional casting slip usually contains about 50 volume percent solids of which up to about 25 percent are colloidal in size. Compositions made from the above listed ingredients, all of which have a specific gravity of about 2.6, will contain about 25–30 weight percent of water. With the appropriate chemical additions, such a slip will have a low enough viscosity to be easily poured and pumped. The low viscosity is due to the fact that the water content is sufficient to both fill the interparticle pore volume of the powder system when all the particles are in contact and also to separate the particles to let them flow past one another during mixing and pouring. The interparticle separation water provides the additional function of supplying an opportunity for chemical dispersants and flocculants to also affect the particle surfaces and therefore the slip rheology."

In column 3 of U.S. Pat. No. 4,880,759, it is disclosed that "Upon pouring the slip into a porous gypsum mold (made from Plaster of Paris), the capillary suction of the mold (about 25 psi) immediately commences the dewatering process. Because the slip contains a highly crowded particle system, the space between the particles is very small, hindering the rapid flow of water through the particle structure to the mold surface. There is, therefore, a pressure gradient decreasing with distance from the mold face and a water flow gradient associated with the pressure gradient. The tendency is to more rapidly dewater the slip nearest the mold face than farther from the face. Removal of this interparticle separation water brings the particles closer together, thus reducing the permeability and the dewatering rate of the cast at the mold face. This in turn reduces the rate of water flow from the unaffected slip to the mold. Therefore there results a nonuniform permeability and nonuniform moisture content across the cake thickness."

U.S. Pat. No. 4,880,759 also discloses that "If a casting slip is fully deflocculated so that all particles, including the colloids, report as individual particles rather than as flocs, and the water flow rate is initially high, the smallest colloids will tend to migrate with the water through the structure of the larger particles and partially plug the pore structure in the mold itself, further reducing the casting rate and exacerbating the nonuniformity of moisture content across the cake. The faster the flow rate, the larger the particles which may migrate with the water."

U.S. Pat. No. 4,880,759 also discloses that "Also, if the slip is fully deflocculated as described above, during the time while the slip is relatively quiescent in the mold during casting the largest particles will settle out of the slip. There is, therefore, a double particle instability in the fully deflocculated slip: colloidal migration to mold faces irrespective of direction, and coarse particles settling downward due to gravity. The first effect is commonly seen in cast pieces, filter press cakes, and occasionally in spray dried pellets where the surface concentration of colloids is high and the center of the part contains a high concentration of coarse particles. Such a result usually causes cracks or parting due to the lack of bonding of coarse particles by the colloids. The second effect prevents long time storage or transportation of the slip without constant agitation."

In the section of U.S. Pat. No. 4,880,759 beginning at line 56 of column 3, it is disclosed that "GELLATION Gelation is the development of a gel structure within a slip or slurry associated with flocculation. It provides a yield stress in the slip which must be exceeded before flow can occur. Below that yield stress the slip behaves as an elastic rather than as a fluid material. The gelation provides several very necessary functions: a. It immobilizes the colloids by flocculation into agglomerates substantially larger than the individual particles, thereby preventing them from migrating with the water as individual particles. The ideal initial rate of gelation must therefore be greater than the initial rate of dewatering. The entire rate of gelation should therefore follow the same power law straight line plot as dewatering but with a slightly higher rate or slope. b. The enlarged flocs effectively increase the size of the pore channels, decreasing the resistance of the water to flow through the particle structure to the mold face. Clay-based ceramic slips usually have a particle size distribution modulus less than 0.37 which provides that the smallest particles in the distribution completely determine the pore size distribution. The smallest particles in a ball clay are about 10 nm, so the channel diameter connecting the interstitial pores are about 1.5 nm (based upon spherical particle models). Such small capillary diameters would almost completely prevent the movement of water at normal mold capillary suction pressure. c. The flocs trap water within them, reducing the water content available to the mold for dewatering. This increases the water retention of the cast and the shrinkage of the part. However, this also improves the moisture uniformity across the cast, reducing differential shrinkage and attendant cracking of the piece. The increased shrinkage and higher moisture retention also improve mold release and plastic trim properties of the cast piece.d. The gel structure is believed to be somewhat continuous throughout the slip, providing the rheological yield strength. This yield strength must be sufficient to prevent the settling of the largest particles from suspension. [Figure] where Ty is yield strength, DL is the largest particle in the slurry, Pp is particle density, Psl=slurry density, and g is a gravitational constant. However, producing a yield strength to accomplish particle stability while not greatly decreasing fluidity is very complex. Furthermore, the gel structure which provides the yield strength must not continue to build beyond that needed to accomplish both colloidal lateral stability and large particle downward stability, or the slip will not drain from the mold at the end of the casting period. The yield strength should approach a terminal strength which allows flow under gravity alone."

In column 4 of U.S. Pat. No. 4,880,759, it is disclosed that "The development and the type of gellation that occurs in clay-based slips or slurries depends upon the nature of the chemical additives used to adjust viscosity as well as the amount, size, and mineralogy of the colloidal matter in the powder. Unravelling the fundamental cause/effect relationships is similar to sorting out the genealogy of a small country village. Everything is interrelated. This is a subject presently under study, and the end is not yet in sight, but a simplistic picture may be seen now, subject to later revision."

U.S. Pat. No. 4,880,759, in the last paragraph of column 4, discloses that "Clay-water slurries or clay based slips may be deflocculated by either inorganic alkali salts or by polymers. The polymers may be either ionic polyelectrolytes or nonionic nonelectrolytes. The alkali salts deflocculate by the mechanism of electrostatic repulsion according to the well known DLVO theory. Polymeric nonionic nonelectrolytes deflocculate by the mechanism of steric hindrance whose magnitude depends upon the molecular weight or the length of the polymer chain, that is, the distance the polymer extends from the powder surface. Polymeric polyelectrolytes probably deflocculate by a combination of electrostatic and steric repulsion, but there is a severe dearth in the technical literature discussing the subject. Flocculation depends upon either electrostatic attraction or the cancellation of repulsion allowing Van derWaal's forces of attraction to dominate the system."

In the first full paragraph of column 5 of U.S. Pat. No. 4,880,759, it is disclosed that "Kaolinite particles are generally hexagonal plates with an aspect ratio, width to thickness, of about 10–30/1. The larger faces of these particles are always negatively charged due to the polarization of the oxygen surface atoms, or an internal charge deficiency due to isomorphous substitution of calcium or magnesium for aluminum, or aluminum for silicon within the two basal layers of the mineral. The edges are positive at pH 4, uncharged at pH 8, and negative at pH 12. These charge differences are due simply to the adsorption of solution excess hydronium ions at low pH, excess hydroxyl ions at high pH, and a balance between the two near neutral pH. At low pH, flocculation occurs due to edge-face electrostatic bonding in a structure called, for obvious reasons, a "cardhouse" structure. This floc structure is quite strong, providing a high yield strength. This is the classical method of flocculating clay slurries and clay based slips. At neutral pH the edges are uncharged, and weak edge-edge bonding provides a fragile "card-pack" floc structure, giving a low yield strength. At high pH both faces and edges provide electrostatic repulsion providing no bonding mechanism, and therefore no structure or yield strength. This is a fully deflocculated system. This classical approach always utilized inorganic salts, such as the sodium salts of silicate, carbonate, phosphate, or hydroxide as deflocculants and calcium, magnesium, or alumnium salts of chloride or sulfate as flocculants."

U.S. Pat. No. 4,880,759 also discloses that "However, if a substantial fraction of the powder is colloidal in size, the smallest particles may possess sufficient Brownian motion at ambient temperature to overcome the repulsive forces and flocculate within the slurry system. The higher the slurry solids loading for any given particle size distribution, the smaller the interparticle spacing, the lower the slurry temperature, and the higher the likelihood of this colloidal auto-flocculation. This always leads to some residual flocculation within the slurry, with its attendant yield stress. That is, a ball clay slurry will always have a yield strength; it is incumbent upon suppliers or users to control it."

U.S. Pat. No. 4,880,759 also discloses that "Ball clays usually contain some form of lignite as an accessory mineral. Some lignites, but not all, contain humates which may be digested to humic acid or sodium humate, which serves as a secondary organic deflocculant. Neither the structure nor chemistry of these humates or their exact contributions to the rheological properties of the slurry is well understood at this time. However, the humates should be classed with the organic deflocculants."

U.S. Pat. No. 4,880,759 also discloses that "As mentioned above, there exists a dearth in the literature of adequate descriptions of the adsorption of polymeric polyelectrolytes from aqueous solutions onto powders in suspension. However, it seems clear that adsorption occurs by hydrophobic repulsion of the hydrocarbon from the water due to the preference water molecules have for each other compared to hydrocarbons, rather than by any mechanism of attraction of the powder for the polymer. This is especially true when the polymer is anionic and the particle surfaces are also negative. This is called the "hydrophobic effect." Therefore adsorption of these polymers upon powder surfaces would lay the hydrocarbon moiety of the polymer against the particle with no significant bond between them while leaving the water soluble moiety, whether ionic or not, in the water phase. Assuming this to be the case, the kaolinite particle is no longer the unit of consideration in the development of a structural arrangement within the slurry. The polymeric coating determines the behavior. If the polymer is anionic, the coated particle is electronegative and pH is less important. The key word in the previous sentence is "less." At high pH the anionic moieties remain negatively charged and repel their neighbors on the same hydrocarbon backbone, thus straightening the polymer to its maximum length. At low pH hydronium ions neutralize the anionic water-soluble moieties, allowing hydrophobicity to fold the polymer into a ball and minimize its effectiveness. Some steric hindrance may still be active, but its electronegativity has disappeared."

U.S. Pat. No. 4,880,759 also discloses that "If the polymer is added to a clay slurry prior to the addition of any divalent flocculating salt such as calcium sulfate, the particle coatings will provide both electrostatic and steric repulsion, minimizing the viscosity. Adding the flocculant first may develop a competition between the negative clay surface and the negative polymer moiety for the calcium ion. The sulfate anion is far less influential due to its low charge density per unit volume."

U.S. Pat. No. 4,880,759 also discloses that "After coating the particles with the polymer, when calcium or magnesium, for example, are added, the divalent cation may adsorb to the negative sites of polymer on two adjacent particles, providing a bridging structure between the polymer coating on two adjacent particles. This structure is probably substantially lower in strength per unit bond than the structure flocculated by inorganic salts. A lower yield strength is essential to good drain performance at the end of the casting of a sanitary ware article. Concomitant with this characteristic, the rate of development of the yield strength must be higher than the dewatering rate. This blend of features depends upon the molecular weight and chelating effectiveness of the polymeric dispersant."

U.S. Pat. No. 4,880,759 also discloses that "The word 'analysis' means to 'tear apart.' In order to understand and control the stability of a slurry or slip, it is necessary to mentally separate it into its constituent parts. There exist at least three separate stabilities which must be measured and controlled in order to be assured that the rheological properties of the slurry do not change. 1. Particle Stability a. Migration of colloidal particles to the mold face reduces the casting rate below a predetermined standard. This is measured by the Casting Rate. b. Sedimentation of the coarsest particles downward due to insufficient yield strength to hold them in suspension increases the solids content of the bottom of a sample under quiescent conditions. This is measured by a Settling Index. 2. Polymer Stability. The optimum condition for polymer stability is presumed to be no more than a monolayer coverage on the powder surface. Excess polymer within the water phase may compete for the bridging cations which develop an optimum gel structure, thereby changing the slurry rheology with time. This is measured by the Percent Transmission of the filtrate from the Casting Rate test. 3. Viscosity Stability There should be very little change in viscosity or in the rate of gelation as a function of time if the above two stabilities are maintained. However, it is the magnitude of the gel structure and its relative strength which determines the particle stability."

U.S. Pat. No. 4,880,759 also discloses that "Changes in both gellation rate and final viscosity after gelation are measured by the Gel Test. The Gel Test is also corroborated by the Brookfield viscosity at 100 rpm and the Flow Test."

U.S. Pat. No. 4,880,759 was based upon a patent application filed on Dec. 16, 1988. However, although 16 years have passed since such patent application was filed, the principles set forth by Professor Funk in such application are still valid.

Furthermore, although 16 years have passed since such patent application was filed, the preparation of suitable casting slips is still something of an art rather than a science, involving the reconciliation of certain apparently contradictory phenomena. In a book published in the 1980's by G. W. Phelps et al. entitled "Rheology and Rheometry of Clay-Water Systems" (Cyprus Industrial Mineral Company, Sandersville, Ga., 1982), it was disclosed (at page 113) that "Slip casting requires apparently contradictory qualities. The slip must be fluid while being pumped or poured. Yet upon cessation of shear the quiescent slip must not allow its larger or higher density particles to settle out or segregate. These demands are met by a slight gelling of the slip when shearing is stopped; however, the degree of gelation must not be so great that the force generated by gravity cannot break the structure and provide quick, clean drain at the end of the casting period. The resulting cast must be plastic enough to allow ready mold release and ready cutting, yet firm enough to stand alone and withstand distortion in handling."

It is known how to make a casting slip from a slurry. Reference may be had, e.g., to U.S. Pat. No. 3,944,425 (foamed lightweight ceramic compositions), U.S. Pat. No. 4,294,635 (process for making glazed ceramicware), U.S. Pat. No. 4,439,532 (casting slip made from spinel), U.S. Pat. No. 4,812,427 (clay slurry), U.S. Pat. No. 4,812,428 (clay slurry), U.S. Pat. No. 4,832,890 (casting process), U.S. Pat. No. 4,880,759 (ball clay slurry), U.S. Pat. No. 4,915,890 (casting process), U.S. Pat. No. 5,034,448 (slip composition for vitreous article), U.S. Pat. No. 5,153,155 (clay slurry), U.S. Pat. No. 5,296,180 (ceramic process), U.S. Pat. No. 5,298,205 (ceramic filter process), U.S. Pat. No. 5,362,692 (refractory casting slip), U.S. Pat. No. 5,458,837 (process for preparing a ceramic wick), U.S. Pat. No. 5,593,930 (high pressure casting slip), U.S. Pat. No. 5,705,118 (process for producing a ceramic body), U.S. Pat. No. 6,524,703 (decorative vitreous beads), U.S. Pat. No. 6,696,377 (clay slurry), and the like. The entire disclosure of each of these United States patents is hereby incorporated by reference into this specification.

Reference also may be had to published U.S. patent application US 20040116274A1 (mullite rich calcined kaolin compositions and method for improved castingrates in cast ceramic bodies), the entire disclosure of which is also hereby incorporated by reference into this specification.

By way of further illustration, reference also may be had, e.g., to a book by Walter L. Shearer entitled "The requisite consistency for a casting slip" (American Ceramic Society, 1928).

Figure 4:
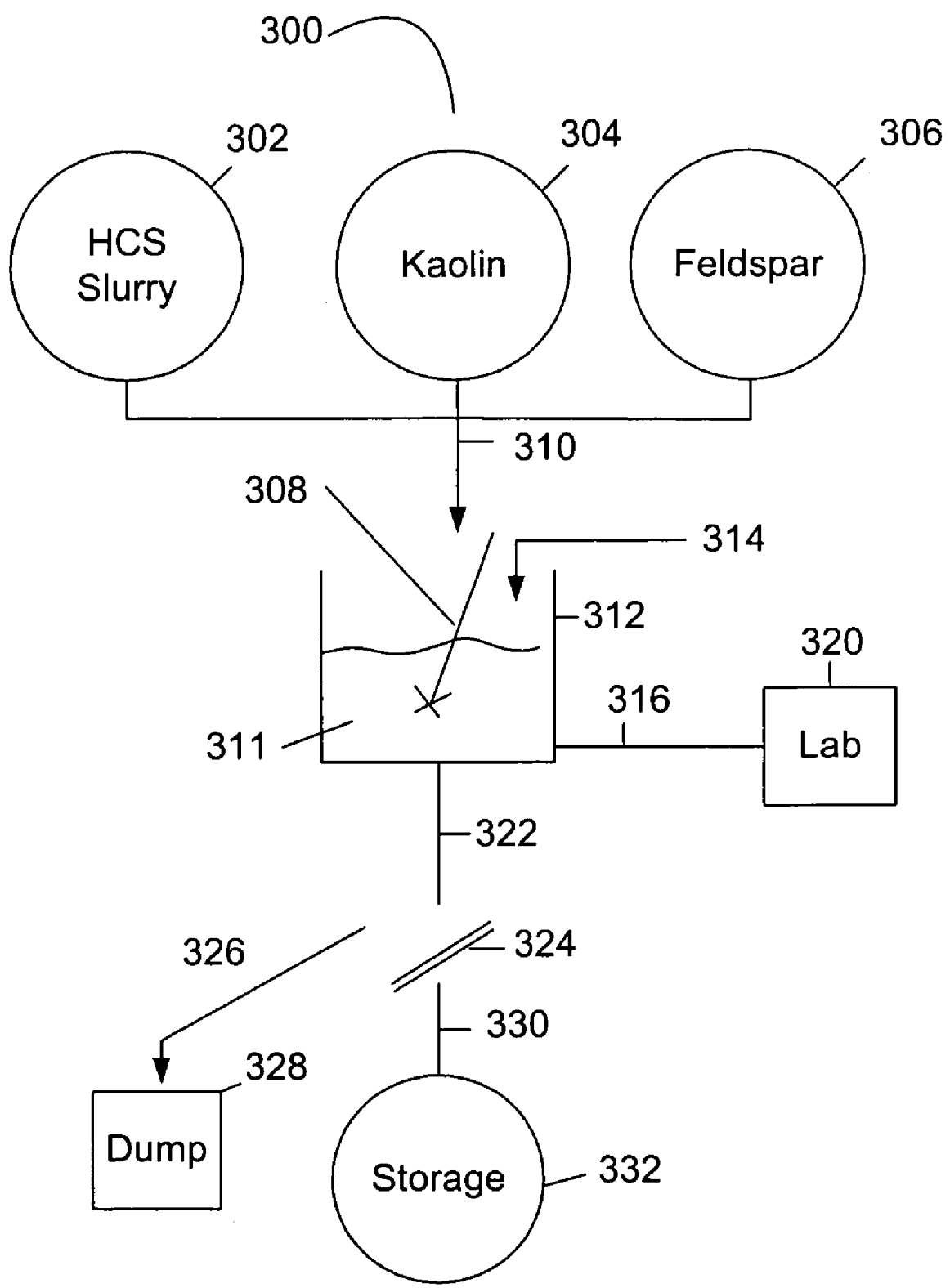
FIG. 4 is a flow diagram of one preferred process for making a casting slip with the siliceous slurry of this invention.

By way of yet further illustration, FIG. 4 is a flow diagram of a process 300 for preparing one preferred casting slip. Referring to FIG. 4 and to the process 300 depicted therein, into storage containers (such as, e.g., sheds and/or silos and/or slurry tanks) 302, 304, and 306 are charged the siliceous slurry of this invention (into tank 302), either kaolin powder and/or a kaolin slurry (into container 304), and feldspar powder (into shed or silo 306).

It is preferred to first charge the slurry (from tank 302) into blunger 312 via line 310, while mixing with mixer 308. In general, a sufficient amount of such slurry is charged into blunger 312 that the resulting mixture contains solids from such slurry that represent from about 45 to about 55 weight percent of the solids (dry weight) in the slip 311 being formed.

After the slurry has been charged via line 310 into the blunger 312, kaolin is then charged (via line 310, and/or via a separate line, not shown) into blunger 310. The kaolin preferably has a particle size such that from about 50 to about 58 weight percent of it is smaller than about 2 microns. A sufficient amount of such kaolin is charged such that from about 10 to about 30 weight percent of the solids in the slip 311 (dry weight) are represented by such kaolin. In one preferred embodiment, from about 15 to about 20 weight percent of such kaolin is used.

After the kaolin has been charged into the blunger 312, feldspar is charged into such blunger (via line 310 and/or via a separate line, not shown). The feldspar generally has a particle size such that from between 5 and 20 weight percent of such feldspar is larger than 44 microns. A sufficient amount of such feldspar is charged such that from about 30 to about 45 weight percent (and, more preferably, from about 32 to about 42 weight percent), dry basis, of the solids in such slip is represented by such feldspar.

During the slip making process, one or more "adjusting materials" may be added via line 314 to adjust the slip's specific gravity (one may add water for this purpose) and/or viscosity (dispersants such as sodium silicate and/or sodium polyacrylate may be added for this purpose, as may be flocculants such as magnesium sulfate or calcium sulfate, as may be pH stabilizers such as calcium carbonate). Reference may be had, e.g., to the United States patents discussed earlier in this specification for a discussion of such "adjusting materials." In one embodiment, from about 0 to about 0.3 weight percent of a polyacrylate dispersing agent, by dry weight of solids material in the slip, is added to the blunger.

The slip properties desired preferably include a solids content of from about 70 to about 75 weight percent (and, more preferably, from about 71 to about 74 weight percent), by dry weight of solids. In one embodiment, the solids content of the slip is from about 72 to about 73 weight percent.

In one embodiment, the desired casting rate of the slip preferably is from about 50 to about 140 grams per 30 minutes. In one aspect of this embodiment, the casting rate of the slip is from about 85 to about 125 grams per 30 minutes. In another aspect of this embodiment, such casting rate is from about 90 to about 120 grams per 30 minutes.

Referring again to FIG. 4, and to the preferred embodiment depicted therein, samples of the slip in blunger 312 are periodically removed via line 316 to test in laboratory 320.

The slip from blunger 312 is discharged via line 322 to scalper screen 324, which removes oversize particles greater than about 60 to 120 mesh; these oversize particles are fed via line 326 to dump 328. The slip passing through scalper screen 324 is fed via line 330 to storage tank 332.

The Casting Slip of this Invention

In this section of the specification, applicant will describe certain properties of his novel casting slip by reference to, e.g., certain A.S.T.M. (American Society for Testing Materials) standard tests.

Properties of the whiteware clays that are used in the slurry and/or the slip may be determined in accordance with ASTM C 322-03 (2003), "Practice for Sampling Ceramic Whiteware Clays."

The loss on ignition properties for the whiteware clays and/or the slurry and/or the slip may be determined in accordance with ASTM C 323-56 (1999), "Test Methods for Chemical Analysis of Ceramic Whiteware Clays."

Sieve analysis for determining particle size distributions for the whiteware clays and/or the slurry and/or the slip may be conducted in substantial accordance with ASTM C 325-81 (1997), "Test Method for Wet Sieve Analysis of Ceramic Whiteware Clays." In the process of this invention, the aforementioned ASTM test procedure is modified by replacing the 100 mesh screen the 140 mesh screen, the 200 mesh screen, and the 325 mesh screen specified in ASTM C-325-81 (1997) with the following mesh screens: 80 mesh (180 micron opening), 120 mesh (125 micron opening), 170 mesh (90 micron opening), 230 mesh (63 micron opening), and 325 mesh (45 micron opening).

The modulus of rupture properties of the slurry and/or the slip and/or the whiteware clays may be determined in substantial accordance with ASTM C-689 (2003a), "Test Method for Modulus of Rupture of Unfired Clays." Although the ASTM test specifies that, in certain cases, the whiteware clay is to be mixed on a 50/50 basis with flint before this test is conducted, this modification of the whiteware clay with flint is omitted in applicant's test procedure.

The casting rate for whiteware clays, slurries, and castings slips may be determined in substantial accordance with ASTM 866-77 (1997), "Test Method for Filtration of Ceramic Whiteware Clays." With regard to the whiteware clays and the slurries made from such clays, the casting rate is preferably determined at a pressure of 90 pounds per square inch (rather than the 50 pounds per square inch pressure specified in the ASTM test) for 60 minutes (rather then the 30 minutes specified in the ASTM test) with a slurry that has been adjusted to minimum viscosity (which generally is less than 200 centipoise). With regard to the casting slip, the casting rate is preferably determined at a pressure of 90 pounds per square inch for 30 minutes at a viscosity that has been adjusted for the viscosity at which the slip normally is used (which generally from about 300 to about 650 centipoise).

The soluble sulfate content of the whiteware clay, the slurries made therefrom, and/or the casting slip may be determined in substantial accordance with ASTM 867-94 (2000), "Test Method for Soluble Sulfate in Ceramic Whiteware Clays (Photometric Method)." In the process of this invention, the aforementioned ASTM test is modified by using light with a wavelength of 500 nanometers rather than the 550 nanometers specified in the ASTM test.

The particle size distribution for particles in the clay and/or the slurry and/or the slip may be determined in accordance with ASTM C 958-92 (2000), "Test Method for Particle Size Distribution of Alumina or Quartz by X-Ray Monitoring of Gravimetric Sedimentation." When using this test method, applicant prefers to use a particle density of 2.56 grams per cubic centimeter for the clays, and a starting diameter for the test of 76 microns.

The Gallenkamp build-up of the slip may be determined by the procedure described elsewhere in this specification. One may determine the value for the initial Gallenkamp build-up, in degrees on a first sample of the casting slip. One may then determine the value of Gallenkamp build-up in a sample that is 72 hours old. It is preferred that the difference between the initial determination, and the determination after 72 hours, divided by the initial determination, is less than about 0.1 and, more preferably, is less than about 0.05.

In one embodiment, one determines both the value of the initial Gallenkamp build-up, in degrees, and the value of Gallenkamp build-up in a sample that is 240 hours old. It is preferred that the difference between the initial determination, and the determination after 240 hours, divided by the initial determination, is less than about 0.1 and, more preferably, is less than about 0.05.

The casting slip of this invention preferably has a solids content of from about 70 to about 75 weight percent, by weight of solids divided by total weight of the slip. In addition to such solids, the slip is preferably comprised of from about 25 to about 30 weight percent of water.

In one embodiment, the casting slip contains from about 71 to about 74 weight percent of solids. In another embodiment, the casting slip contains from about 72 to about 74 weight percent of solids. In yet another embodiment, the casting slip contains form about 72.3 to about 73.6 weight percent of solids.

The casting rate of the casting slip preferably ranges from about 50 to about 140 grams per 30 minutes. In one embodiment, the casting rate of the casting slip is from about 90 to about 120 grams per 30 minutes.

As is known to those skilled in the art, the casting rate of a slip, including applicant's claimed slip, may be varied by adding casting rate adjusting materials such as, e.g., flocculants (such as calcium sulfate, magnesium sulfate, and the like), deflocculants (such as, e.g., sodium silicate, sodium polyacrylate, and the like), etc. Alternatively, or additionally, one may vary the casting rate of a slip by changing its particle size distribution. In general, when the concentration of "fines" (particles smaller than 1 micron) is decreased, the casting rate increases, and vice versa.

Figure 5:
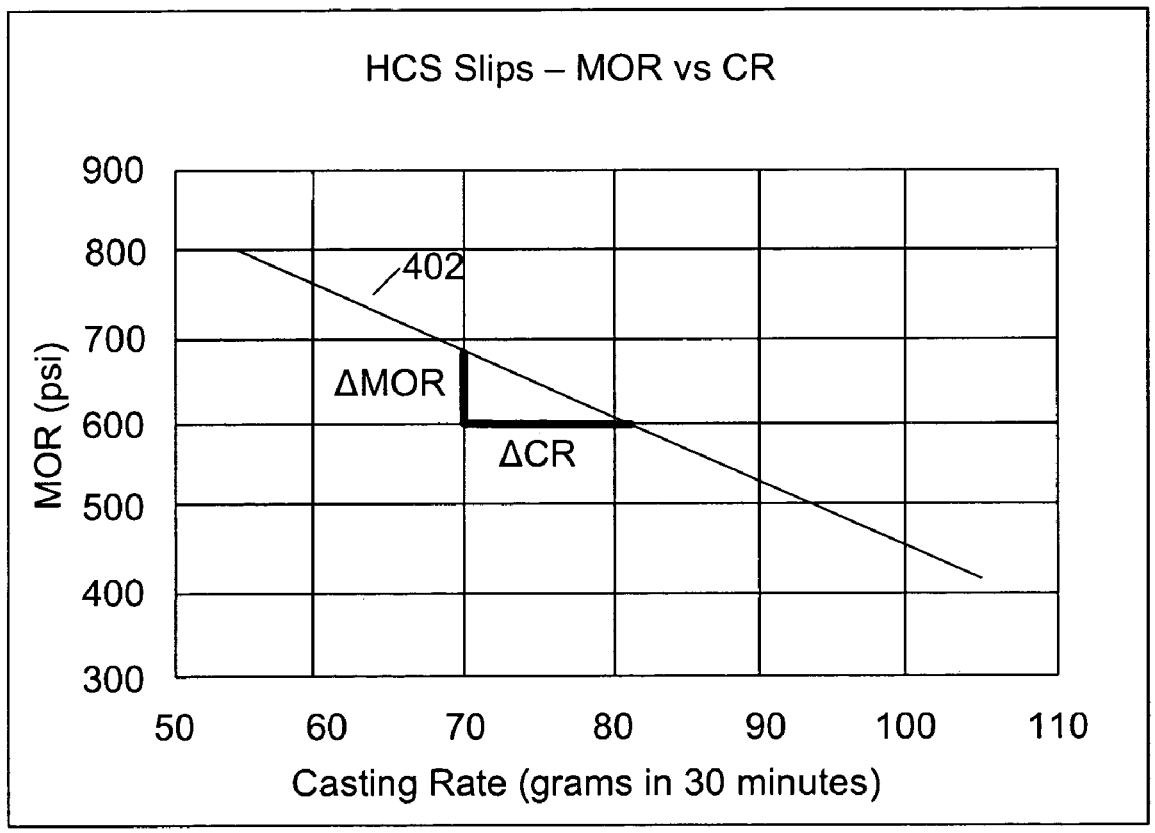
FIG. 5 is a graph of a series of slips, and it is a plot of the modulus of rupture of the slip (in pounds per square inch) versus the casting rate of the slip (in grams per 30 minutes).

FIG. 5 is a graph of a series of slips of this invention which are similar in many respects but differ in their casting rates and their concentration of fines; and it is a plot of the modulus of rupture of the slip (in pounds per square inch) versus the casting rate of the slip (in grams per 30 minutes). As will be seen, a substantially linear plot 402 is produced whose slope (the difference in the modulus of rupture divided by the difference in casting rate) is preferably from about 0.72 to 0.84. In one embodiment, such slope is from about 0.76 to about 0.80. In another embodiment, such slope is from about 0.77 to about 0.79.

The dry modulus of rupture of the casting slip preferably is from about 400 to about 900 pounds per square inch; as will be apparent to those skilled in the art, such dry modulus of rupture is determined on pre-fired casting slip. In one embodiment, the modulus of rupture of the slip is from about 420 to about 650 pounds per square inch. In yet another embodiment, the modulus of rupture is from about 440 to about 600 pounds per square inch.

In one embodiment, the casting slip of this invention, from about 3 to about 5 weight percent of the particles in the casting slip (dry weight) are greater in size than 75 microns. In one embodiment, from about 3.5 to about 4.7 weight percent of the particles in the casting slip are greater than 75 microns in size.

In one embodiment of the casting slip of this invention, from about 8 to about 11 weight percent of the particles in the casting slip (dry weight) are greater in size than about 45 microns. In one aspect of this embodiment, from about 8.5 to about 10.5 weight percent of the particles in the casting slip are greater in size than about 45 microns. In yet another aspect of this embodiment, from about 9 to about 10 weight percent of the particles in the casting slip are greater in size than about 45 microns.

In one embodiment, the ratio of the weight percent of the particles in the slip (dry weight) that are greater than 75 microns divided by the weight percent of the particles in the slip (dry weight) that are greater than 45 microns is greater than 0.3 and, preferably, greater than 0.35. In one embodiment, said ratio is greater than 0.4. In another embodiment, said ratio is greater than 0.45.

The Water Absorption of the Casting Slip of the Instant Invention

In one preferred embodiment, the casting slip of the instant invention is said to have a water absorption of less than about 0.5 percent. By this it is meant that, when said casting slip is used to make a green body by a specified procedure, and when said green body is fired by a specified procedure, the fired body has an absorption of less than about 0.5 percent.

In the first part of this specified procedure, the casting slip is first used to make a green body with a cylindrical cross-section that has a length of 4 inches and a diameter of 0.75 inches. This cylindrical green body is then dried to a moisture content of less than about 0.5 percent by heating it an oven at a temperature of 110 degrees Celsius for at least 24 hours.

In the second part of this specified procedure, the dried green body is then fired at pyrometric cones 5–10. The green body is placed into a kiln at ambient temperature, and the temperature of the kiln is raised at a rate of 3 degrees Celsius per minute to a temperature of 900 degrees Celsius. Thereafter, the temperature is raised at a rate of 2.2 degrees Celsius per minute to a temperature of 1,100 degrees Celsius. Thereafter, the temperature is raised at a rate of 2.0 degrees Celsius per minutes to a temperature of 1,236 degrees Celsius. Thereafter, the temperature is held at a temperature of 1,236 degrees Celsius or until the desired pyrometric cone has deformed.

As will be apparent to those skilled in the art, cone 5 deforms at 1,159 degrees Celsius, cone 6 deforms at 1,185 degrees Celsius, cone 7 deforms at 1,201 degrees Celsius, cone 8 deforms at 1,211 degrees Celsius, cone 9 deforms at 1,224 degrees Celsius, and cone 10 deforms at 1,251 degrees Celsius.

In one embodiment, the dried green body is fired at a temperature 1,201 degrees Celsius for from about 60 to about 90 minutes after the temperature has been raised to 1,201 degrees Celsius in substantial accordance with the heating schedule described in the preceding paragraph. Thereafter, the dried green body is allowed to cool to ambient over a period of at least about 12 hours.

In the third part of this specified procedure, the fired body thus produced is tested to determine whether it has a water absorption of less than about 0.5 percent. The water absorption of such a fired body may be determined in accordance with ASTM C 373-88 (Reapproved 1999), entitled "Standard Test Method for Water Absorption, Bulk Density, Apparent Porosity, and Apparent Specific Gravity of Fired Whiteware Products." In this water absorption test, the test specimen is dried to constant mass (by heating in an oven at 150 degrees Celsius) followed by cooling in a dessicator; and the dry mass is then determined. Thereafter, the dried sample is placed in a pan of distilled water and boiled for five (5) hours, after which the samples are allowed to soak in the water for an additional 24 hours. The so-treated samples are then weighed, and the difference in the weight between the "dry sample" and the "wet sample" is measured. Reference may be had, e.g., to U.S. Pat. No. 5,403,790 (additives for property modification in ceramic composite bodies), U.S. Pat. No. 5,405,592 (non-densified silicon nitride beta-phase material), U.S. Pat. No. 5,558,690 (manufacture of ceramic tiles from spent aluminum potlining), U.S. Pat. No. 5,562,765 (iron-manganese colorant), U.S. Pat. No. 5,775,835 (embedment tiles), U.S. Pat. No. 5,935,885 (manufacture of ceramic tiles from fly ash), U.S. Pat. No. 6,800,242 (process for making an alkali resistant ceramic material), U.S. Pat. No. 6,846,768 (methods and compositions for low thermal expansion ceramic), and the like; the entire disclosure of each of these U.S. patents is hereby incorporated by reference into this specification.

In one embodiment, the water absorption of the fired body made by the casting slip of this invention is less than about 0.14 percent.

The Settling Index of the Casting Slip of the Invention

In one preferred embodiment, the casting slip of this invention has a settling index of at least about 0.90 and, more preferably, at least about 0.95. In one aspect of this embodiment, such settling index is at least about 0.96.

The Silica Content of the Casting Slip of the Invention

The casting slip of this invention preferably is comprised of silica, at least 50 weight percent of which contains less than about $10^{17}$ Si and Si—O silicon-based radicals per gram. In one embodiment, at least about 50 weight percent of said silica contains less than about $10^{16}$ Si and Si—O silicon based radicals per gram.

In general, such casting slip contains at least 60 weight percent of silica and, more preferably, at least about 62 weight percent of silica, by dry weight of solid materials.

EXAMPLES

The following examples are presented to illustrate the claimed invention but are not to be deemed limitative thereof. Unless otherwise specified, all parts are by weight, and all temperatures are in degrees Celsius.

Example 1

A highly siliceous crude clay from Gleason, Tenn., called "Chappell Sand Seam," was used in this experiment and designated as "S6148." The clay contained 33.75 percent particles smaller than 44 microns, it had a specific surface area of 11.05 square meters per gram, and it contained 27.4 percent of its particles smaller than 0.5 microns. The clay contained at least 66 weight percent of silica.

Another clay from Henry County, Tenn. was also used in the experiment of this example. The second clay, designated as "S6153," contained 4.58 percent particles larger than 44 microns, a specific surface area of 27.7 square meters per gram, and it contained 21.4 percent of its particles smaller than 0.5 microns. The clay contained 64.4 weight percent of silica.

An 80/20 mixture of the first/second clay was prepared by first adding the second clay (S6153) to hot water at a temperature of 65 degrees Celsius with blunging, and with the addition of 0.034 percent (by weight) sodium carbonate. After the second clay was added to the blunger, then the first the clay (S6148) was added to the blunger while 0.168 weight percent of sodium polyacrylate dispersing agent was added during the addition.

The slurry so produced had a specific gravity of 1.654, and it contained 23.7 weight percent of particles smaller than 0.5 microns. The slurry had a specific surface area of 13.75 square meters per gram, a casting rate of 148.3 grams per hour. The slurry contained at least 65.4 weight percent of silica. It contained 0.433 weight percent of carbon.

Example 2

The procedure of Example 1 was substantially followed, with the exception that different clays were used. These different clays are described in Table 2.

TABLE 2

| Sample ID | Formula | SpecGrav | % < 0.5 um | SSA | SiO2 | +325 mesh | % carbon | casting rate |
|---|---|---|---|---|---|---|---|---|
| S6467 | 25% | | 25.7 | 12.39 | 68.2 | 23.73 | | |
| S6591 | 25% | | 29.8 | 13.59 | 61.7 | 29.52 | | |
| S5759 | 30% | | 29.7 | 14.52 | 62.5 | 15.21 | | |
| S6199* | 20% | | 31.6 | 29.58 | 64.0 | 2.94 | | |
| S6602** | | 1.655 | 30.0 | 17.19 | 65.5 | 19.88 | 0.374 | 112.9 |

*includes portions of S6152 and S6153

**S6602 slurry was made using 0.286% sodium silicate

Referring to Table 2, and in the experiment of Example 2, it will be seen clays S6467, S6591, S5759, and mixed sample of S6199 and S6152 and S6153 were mixed together and blunged in accordance with the procedure of Example 1 to produce the slurry of this example (S6602). The slurry had a specific gravity of 1.655, contained 30 percent of particles smaller than 0.5 microns, had a specific surface area of 17.9 square meters per gram, contained 65.5 weight percent of silica.

Example 3

Preparation of Casting Slip

Example 3 describes the preparation of several different casting slips. The casting slip of Example 3 is a "control slip" made in a traditional manner known to those in the prior art. The casting slips of Examples 5 and 6 are made with the slurry of this invention.

In the experiment of Example 3, a slip was made with "Flo-Tech" slurry. This "Flo-Tech" slurry is sold by the H.C. Spinks Clay Company of Paris, Tenn. The slurry used in this experiment, identified as "WP 1857," had a soluble sulfate concentration of 295 parts per million, a particle size distribution such that 91.8 percent of the particles were smaller than 20 microns, 82 percent were smaller than 10 microns, 71.6 percent of the particles were less than 5 microns, 55.9 percent of the particles were less than 2 microns, 46.9 percent of the particles were less than 1 micron, 37.4 percent of the particles were less than 0.5 microns. The specific surface area of the slurry was 17.15 square meters per gram.

Referring again to Table 3, an in Example 3 thereof, 35 weight percent (by dry weight of solids) of the "Flo-Tech" slurry was mixed with 15.0 weight percent of kaolin slurry (by dry weight of solids), 35 dry weight percent of feldspar, and 15 weight percent of flint.

The kaolin slurry used in Example 3 contained 314 parts per million of soluble sulfate ion, and it contained 95.6 weight percent of particles less than 20 microns, 86.4 weight percent of particles smaller than 10 microns, 72.4 weight percent of particles smaller than 5 microns, 51.0 percent of particles smaller than 2 microns, 38.2 weight percent of particles smaller than 1 microns, and 25.4 weight percent of particles less than 0.5 microns. The specific surface area of the kaolin slurry was 10.17 square meters per gram.

The feldspar used in the experiment of Example 3 was a commercially available feldspar, NC-4 soda feldspar, supplied by the Zemex Corporation of Spruce Pine, N.C.

The silica used in the experiment of Example 3 was a flint produced by U.S. Silica of Millcreek, Okla., and it was identified by product number C3675. This flint contained 0.72 weight percent of particles greater than 75 microns, and it also contained 4.98 weight percent of particles greater than 45 microns.

In the experiment of Example 3, water was added to a blunger, and thereafter the Flo-Tech slurry was charged to the blunger with mixing. Thereafter, the kaolin slurry was added to the mixture and blunged until a homogeneous mixture was obtained.

Thereafter, polyacrylate dispersing agent ("ACUMER 9400," obtained from the Rohm & Haas Company of Philadelphia, Pa.) was added as necessary to maintain mixing viscosity, while blunging the mixture. About 0.06 weight percent of the polyacrylate, by dry weight of solids, was added during the blunging process.

The casting slip produced in the experiment of this example 3 contained 0.71 weight percent of particles greater than 75 microns and 3.54 weight percent of particles greater than 45 microns; and it had a settling index of 0.93. It had an initial 6 minute Gallenkamp buildup of 53 degrees; however, after the slip had been "aged" for 3 days, it's Gallenkamp buildup had dropped to 21 degrees.

The Gallenkamp build-up test is well known to those skilled in the art and is described, e.g., in U.S. Pat. No. 4,812,427 (clay slurry), U.S. Pat. No. 4,812,428 (process for preparing a clay slurry), U.S. Pat. No. 4,880,759 (ball clay slurry), U.S. Pat. No. 5,153,155 (clay slurry), U.S. Pat. No. 6,696,377 (clay slurry), and the like. The entire disclosure of each of these United States patents is hereby incorporated by reference into this specification.

By way of further illustration, and as is disclosed in U.S. Pat. No. 4,812,427, "This test is conducted on a Gallenkamp Universal Torsion Viscometer model VHA-200-M (manufactured by Gallenkamp, London, England). Cylinder VHA-220-050G (11/16″ diameter) and torsion wire VHA-220-2110K (30 swg) are used in the test. In this test, a sample of slurry is mixed with the Lightning Mixer for about 1 minute. The Gallenkamp is pre-loaded (turned one revolution). About 250 cubic centimeters of the mixed slurry is transferred to a beaker which is placed under the Gallenkamp with the spindle of the Gallenkamp submerged in the slurry. The spindle is then released, and a reading is taken of how many degrees overswing it rotates in the slurry. Thereafter the spindle is again loaded, the shaft is wetted with water, 6 minutes is allowed to elapse, the spindle is again released, and a second reading is taken of how many degrees overswing it rotates. The difference between the first reading and the second reading, in degrees, is the Gallenkamp build up."

TABLE 3

| | Example 3 Batch Percent | Example 4 Batch Percent | Example 5 Batch Percent | Example 6 Batch Percent |
|---|---|---|---|---|
| Materials | | | | |
| Flo-Tech | 35.00% | 35.00% | | |
| HCS | | | 50.00% | 50.00% |
| Kaolin 1 | 15.00% | 15.00% | 15.00% | |
| Kaolin 2 | | | | 15.00% |
| Feldspar | 35.00% | 35.00% | 35.00% | 35.00% |
| Silica (flint) | 15.00% | | | |
| Silica (flint) | | 15.00% | | |
| | 100.00% | 100.00% | 100.00% | 100.00% |
| Test Results | | | | |
| % > 75 um (+200 mesh) | 0.71% | 0.92% | 3.00% | 3.03% |
| % > 45 um (+325 mesh) | 3.54% | 4.41% | 8.11% | 8.23% |
| Settling Index | 0.93 | 0.95 | 0.97 | 0.97 |
| Gallenkamp 6 minute Buildup (before ageing) | 53 | 51 | 55 | 41 |
| Gallenkamp 6 minute Buildup (after 3 days ageing) | 21 | 61 | 56 | 40 |

Example 4

Preparation of a Casting Slip

The procedure of Example 3 was substantially followed, with the exception that the C3675 flint used in the experiment of Example 3 was replaced with an "S7164 flint" obtained from the Unimin Corporation of Cleburne, Tex., and also with the exception that 0.013 weight percent of the polyacrylate dispersing agent was used. This latter flint contained 2.11 weight percent of particles greater than 75 microns, and it also contained 10.74 weight percent of particles greater than 45 microns.

The casting slip produced in this example contained 0.92 weight percent of particles greater than 75 microns, and it also contained 4.41 weight percent of particles greater than 45 microns. The settling index of the slip was 0.95. The initial Gallenkamp buildup for this slip was 51 degrees, but it increased to 61 degrees after 3 days of 'aging.'

Example 5

Preparation of Casting Slip

The procedure of Examples 3 and 4 were substantially followed, with the exceptions that (a) the "Flo-Tech" slurry was replaced with "HCS" slurry, the step of adding the flint material was omitted, no water was added, and no dispersing agent was added.

The casting slip so produced contained 3.0 weight percent of particles greater than 75 microns, 8.11 weight percent of particles greater than 45 microns; and it had a settling index of 0.97. The initial Gallenkamp build-up was 55 degrees, but it varied by only 1 degree (going to 56 degrees) after 3 days of aging.

Example 6

Preparation of Casting Slip

The procedure of Example 5 was substantially followed, with the exception the exception that a different kaolin slurry was used. The kaolin slurry used in this Example contained 190 parts per million of soluble sulfate ion, and it contained 94.6 weight percent of particles finer than 20 microns, 86.4 weight percent of particles finer than 10 microns, 72.9 weight percent of particles finer than 5 microns, 53.4 weight percent of particles smaller than 2 microns, 40.9 weight percent of particles smaller than 1 micron, and 25.6 weight percent of particles smaller than 0.5 microns. The specific surface area of this kaolin slurry was 13.3 square meters per gram.

The casting slip so produced contained 3.03 weight percent of particles greater than 75 microns and 8.23 weight percent of particles greater than 45 microns; and it had a settling index of 0.97. The initial Gallenkamp build-up was 41 degrees, but it varied by only 1 degree (going to 40 degrees) after 3 days of aging.

In one embodiment the clay(s) used in this invention for ball clay slurry can instead be used in the manufacture of fire-rated ceiling tiles, asphalt emulsions used as driveway/pavement sealing compounds, the paper backing of gypsum wall board products, acoustical damping panels, and/or high temperature refractories.

It is to be understood that the foregoing description and examples are illustrative only and that changes can be made in the ingredients and their proportions and in the sequence and combinations of process steps as well as in other aspects of the inventions discussed without departing from the scope of the invention as defined in the following claims.

I claim:

1. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, and wherein the ratio of weight percent of said particles that are greater than about 75 microns to the weight percent of said particles that are greater than about 45 microns is from about 0.5 to about 0.7.

2. The clay slurry as recited in claim 1, wherein said ratio of weight percent of said particles that are greater than about 75 microns to the weight percent of said particles that are greater than about 45 microns is from about 0.53 to about 0.68.

3. The clay slurry as recited in claim 1, wherein said ratio of weight percent of said particles that are greater than about 75 microns to the weight percent of said particles that are greater than about 45 microns is from about 0.55 to about 0.60.

4. The clay slurry as recited in claim 1, wherein said clay slurry has a solids content of from about 60 to about 65 weight percent.

5. The clay slurry as recited in claim 4, wherein said slurry is comprised of from about 70 to about 74 weight percent of silica.

6. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, wherein from about 55 to about 67 weight percent of the particles in said slurry are smaller than about 2 microns.

7. The clay slurry as recited in claim 6, wherein the ratio of weight percent of said particles that are greater than about 75 microns to the weight percent of said particles that are greater than about 45 microns is from about 0.5 to about 0.7.

8. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, wherein from about 46 to about 60 weight percent of the particles in said slurry are smaller than about 1 microns.

9. The clay slurry as recited in claim 8, wherein the ratio of weight percent of said particles that are greater than about 75 microns to the weight percent of said particles that are greater than about 45 microns is from about 05 to about 0.7.

10. A clay slurry with a solids content of from 57 about to about 75 weight percent and a casting rate of at least 60 grams per hour, wherein said slurry comprises from about 68 to about 75 weight percent of silica, wherein from about 9 to about 30 weight percent of the particles in said slurry are larger than about 45 microns, wherein from about 5 to about 20 weight percent of the particles in said slurry are larger than about 75 microns, wherein from about 37 to about 52 weight percent of the particles in said slurry are smaller than about 0.5 microns.

11. The clay slurry as recited in claim 10, wherein the ratio of weight percent of said particles that are greater than about 75 microns to the weight percent of said particles that are greater than about 46 microns is from about 0.6 to about 0.7.

12. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, and wherein said clay slurry has a loss on ignition of from about 6 to about 7.7 percent.

13. The clay slurry as recited in claim 12, wherein the ratio of weight percent of said particles that are greater than about 75 microns to the weight percent of said particles that are greater than about 45 microns is from about 0.5 to about 0.7.

14. The clay slurry as recited in claim 12, wherein said clay slurry has a loss on ignition of less than about 7.1.

15. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, and wherein said clay slurry has a settling index of at least about 0.9.

16. The clay slurry as recited in claim 15, wherein the ratio of weight percent of said particles that are greater than about 75 microns to the weight percent of said particles that are greater than about 45 microns is from about 0.5 to about 0.7.

17. A clay slurry with a solids content of from 57 about to about 75 weight percent and a casting rate of at least 60 grams per hour, wherein said slurry comprises from about 68 to about 74 weight percent of silica, wherein from about 9 to about 30 weight percent of the particles in said slurry are larger than about 45 microns, wherein from about 5 to about 20 weight percent of the particles in said slurry are larger than about 75 microns, and wherein said clay slurry is comprised of at least about 0.1 weight percent, by weight of said solids, of an organic compound.

18. The clay slurry as recited in claim 17, wherein said organic compound is selected from the group consisting of humic acid, humate, and mixtures thereof.

19. The clay slurry as recited in claim 17, wherein the ratio of weight percent of said particles that are greater than about 75 microns to the weight percent of said particles that are greater than about 45 microns is from about 0.5 to about 0.7.

20. The slurry as recited in claim 1, wherein said slurry contains at least about 72 weight percent of silica.

21. The slurry as recited in claim 1, wherein said slurry is comprised of organic polyacrylate dispersing agent.

22. The clay slurry as recited in claim 1, wherein said slurry is comprised of sodium silicate dispersing agent.

23. The clay slurry as recited in claim 1, wherein said slurry is comprised of less than about 650 parts per million of soluble sulfate ion.

24. The clay slurry as recited in claim 1, wherein said slurry has a Gallenkamp build up of from about 65 to about 100 degrees.

25. A clay slurry with a solids content of from 57 about to about 75 weight percent and a casting rate of at least 60 grams per hour, wherein said slurry comprises from about 68 to about 74 weight percent of silica and from about 14 to about 21 weight percent of alumina wherein from about 9 to about 30 weight percent of the particles in said slurry are larger than about 45 microns, wherein from about 5 to about 20 weight percent of the particles in said slurry are larger than about 75 microns.

26. The clay slurry as recited in claim 25, wherein the ratio of weight percent of said particles that are greater than-about 75 microns to the weight percent of said particles that are greater than about 45 microns is from about 0.5 to about 0.7.

27. The clay slurry as recited in claim 25, wherein the ratio of weight percent of said silica to weight percent of said alumina in said slurry is at least about 3.2.

28. The clay slurry as recited in claim 25, wherein the ratio of weight percent of said silica to weight percent of said alumina in said slurry is at least about 4.0.

29. A clay slurry with a solids content of from 57 about to about 75 weight percent and a casting rate of at least 60 grams per hour, wherein said slurry comprises from about 68 to about 74 weight percent of silica, less than 0.8 weight percent of carbon, wherein from about 0 to about 30 weight percent of the particles in said slurry are larger than about 45 microns wherein from about 5 to about 20 weight percent of the particles in said slurry are larger than about 75 microns.

30. The clay slurry as recited in claim 29, wherein the ratio of weight percent of said particles that are greater than about 75 microns to the weight percent of said particles that are greater than about 45 microns is from about 0.5 to about 0.7.

31. The clay slurry as recited in claim 29, wherein said slurry is comprised of less than about 0.7 weight percent of carbon.

32. A clay slurry with a solids content of from 57 about to about 75 weight percent and a casting rate of at least 60 grams per hour, wherein said slurry comprises from about 68 to about 74 weight percent of silica, and wherein at least about 90 weight percent of said silica contains less than about $10^{17}$ Si and Si—O silicon-based radicals per gram, wherein at least about 9 weight percent of the particles in said slurry are larger than about 44 microns, and wherein at least about 5 weight percent of the particles in said slurry are larger than about 74 microns.

33. The clay slurry as recited in claim 32, wherein from about 9 to about 30 weight percent of the particles in said slurry are larger than about 45 microns, and wherein from about 5 to about 20 weight percent of the particles in said slurry are larger than about 75 microns.

34. The clay slurry as recited in claim 33, wherein the ratio of weight percent of said particles that are greater than about 75 microns to the weight percent of said particles that are greater than about 45 microns is from about 0.5 to about 0.7.

35. The clay slurry as recited in claim 32, wherein at least about 90 weight percent said silica contains less than about $10^{16}$ Si and Si—O silicon based radicals per gram.

36. A casting slip with a solids content of from about 70 to about 75 weight percent, a casting rate of from about 50 to about 140 grams per 30 minutes, and a modulus of rupture of from about 400 to about 900 pounds per square inch, wherein from about 3 to about 5 weight percent of the particles in said casting slip are greater than about 75 microns.

37. The casting slip as recited in claim 36, wherein said casting slip is comprised of from about 71 to about 74 weight percent of solids.

38. The casting slip as recited in claim 37, wherein said casting slip has a casting rate of from about 90 to about 120 grams per 30 minutes.

39. The casting slip as recited in claim 38, wherein said casting slip has a modulus of rupture of from about 420 to about 650 pounds per square inch.

40. The casting slip as recited in claim 38, wherein said casting slip is comprised of from about 8 to about 11 percent of particles greater than 45 microns.

41. The casting slip as recited in claim 40, wherein the ratio of the weight percent of said particles greater than about 75 microns in said casting slip divided by the weight percent of said particles greater than about 45 microns in said casting slip is greater than about 0.3.

42. A casting slip with a solids content of from about 70 to about 75 percent, a casting rate of from about 50 to about 140 grams per 30 minutes, and a modulus of rupture of from about 400 to about 900 pounds per square inch, wherein from about 8 to about 11 weight percent of the particles in said casting slip are greater than about 45 microns.

43. The casting slip as recited in claim 42, wherein said casting slip is comprised of from about 71 to about 74 weight percent of solids.

44. The casting slip as recited in claim 43, wherein said casting slip has a casting rate of from about 90 to about 120 grams per 30 minutes.

45. The casting slip as recited in claim 44, wherein said casting slip has a modulus of rupture of from about 420 to about 650 pounds per square inch.

46. The casting slip as recited in claim 45, wherein said casting slip is comprised of from about 3.5 to about 4.7 percent of particles greater than 75 microns.

47. The casting slip as recited in claim 40, wherein the ratio of the weight percent of said particles greater than about 75 microns in said casting slip divided by the weight percent of said particles greater than about 45 microns in said casting slip is greater than about 0.35.

48. The casting slip as recited in claim 47, wherein said casting slip is comprised of from about 72 to about 74 weight percent of solids.

49. The casting slip as recited in claim 48, wherein said casting slip has a modulus of rupture of from about 440 to about 600.

50. A casting slip with a solids content of from about 70 to about 75 percent and a casting rate of from about 50 to about 140 grams per 30 minutes, wherein:
   (a) from about 3 to about 5 weight percent of the particles in said casting slip are greater than about 75 microns,
   (b) from about 8 to about 11 percent of particles in said casting slip are greater than 45 microns, and
   (c) said casting slip has a water absorption of less than about 0.5 percent.

51. The casting slip as recited in claim 50, wherein said casting slip has settling index of at least about 0.90.

52. The casting slip as recited in claim 51, wherein said casting slip has a water absorption of less than about 0.14 percent.

53. The casting slip as recited in claim 52, wherein said casting slip has a settling index of at least about 0.95.

54. A casting slip with a solids content of from about 70 to about 75 percent and a casting rate of from about 50 to about 140 grams per 30 minutes, wherein:
   (a) from about 3 to about 5 weight percent of the particles in said casting slip are greater than about 75 microns,
   (b) from about 8 to about 11 percent of particles in said casting slip are greater than 45 microns, and
   (c) said casting slip has a settling index of at least about 0.90.

55. A casting slip with a solids content of from about 70 to about 75 percent and a casting rate of from about 50 to about 140 grams per 30 minutes, wherein:
   (a) from about 3 to about 5 weight percent of the particles in said casting slip are greater than about 75 microns, and
   (b) said casting slip has a water absorption of less than about 0.5 percent.

56. A casting slip with a solids content of from about 70 to about 75 percent and a casting rate of from about 50 to about 140 grams per 30 minutes, wherein:
   (a) from about 8 to about 11 percent of particles in said casting slip are greater than 45 microns, and
   (b) said casting slip has a water absorption of less than about 0.5 percent.

57. A casting slip with a solids content of from about 70 to about 75 percent and a casting rate of from about 50 to about 140 grams per 30 minutes, wherein:
   (a) from about 3 to about 5 weight percent of the particles in said casting slip are greater than about 75 microns,
   (b) from about 8 to about 11 percent of particles in said casting slip are greater than 45 microns, and
   (c) the ratio of the weight percent of said particles greater than about 75 microns in said casting slip divided by the weight percent of said particles greater than about 45 microns in said casting slip is greater than about 0.3.

58. The casting slip as recited in claim 57, wherein said casting slip has a water absorption of less than about 0.5 percent.

59. The casting slip as recited in claim 57, wherein said casting slip has a water absorption of less than about 0.14 percent.

60. A casting slip with a solids content of from about 70 to about 75 percent, a casting rate of from about 50 to about 140 grams per 30 minutes, and a Gallenkamp buildup that varies less than 5 percent from its initial value after it has been aged for 3 days, wherein at least about 3 weight percent of the particles in said casting slip are greater than about 75 microns.

61. The casting slip as recited in claim 60, wherein from about 3 to about 5 weight percent of the particles in said casting slip are greater than about 75 microns.

62. The casting slip as recited in claim 60, wherein said casting slip is comprised of from about 71 to about 74 weight percent of solids.

63. The casting slip as recited in claim 60, wherein said casting slip has a casting rate of from about 90 to about 120 grams per 30 minutes.

64. The casting slip as recited in claim 60, wherein said casting slip has a modulus of rupture of from about 420 to about 650 pounds per square inch.

65. The casting slip as recited in claim 60, wherein said casting slip is comprised of from about 8 to about 11 percent of particles greater than 45 microns.

66. The casting slip as recited in claim 60, wherein said casting slip is comprised of from about 3 to about 5 weight percent of particles greater than about 75 microns, and wherein the ratio of the weight percent of said particles greater than about 75 microns in said casting slip divided by the weight percent of said particles greater than about 45 microns in said casting slip is greater than about 0.3.

67. The casting slip as recited in claim 60, wherein said casting slip has a modulus of rupture of from about 400 to about 900 pounds per square inch.

68. The casting slip as recited in claim 67, wherein said casting slip is comprised of from about 71 to about 74 weight percent of solids.

69. The casting slip as recited in claim 68, wherein said casting slip has a casting rate of from about 90 to about 120 grams per 30 minutes.

70. The casting slip as recited in claim 60, wherein said casting slip is comprised of from about 3.5 to about 4.7 percent of particles greater than 75 microns.

71. The casting slip as recited in claim 70, wherein said casting slip is comprised of from about 8 to about 11 weight percent of particles greater than about 45 microns, and wherein the ratio of the weight percent of said particles greater than about 75 microns in said casting slip divided by the weight percent of said particles greater than about 45 microns in said casting slip is greater than about 0.35.

72. The casting slip as recited in claim 71, wherein said casting slip is comprised of from about 72 to about 74 weight percent of solids.

73. The casting slip as recited in claim 72, wherein said casting slip has a modulus of rupture of from about 440 to about 600.

74. The casting slip as recited in claim 60, wherein said casting slip has a water absorption of less than about 0.5 percent.

75. The casting slip as recited in claim 60, wherein said casting slip has settling index of at least about 0.90.

76. The casting slip as recited in claim 75, wherein said casting slip has a water absorption of less than about 0.5 percent.

77. The casting slip as recited in claim 75, wherein said casting slip has a water absorption of less than about 0.14 percent.

78. The casting slip as recited in claim 77, wherein said casting slip has a settling index of at least about 0.95.

79. A casting slip with a solids content of from about 70 to about 75 percent, a casting rate of from about 50 to about 140 grams per 30 minutes, and a Gallenkamp buildup that varies less than 5 percent from its initial value after it has been aged for 10 days, wherein at least about 3 weight percent of the particles in said casting slip are greater than about 75 microns.

80. The casting slip as recited in claim 79, wherein from about 3 to about 5 weight percent of the particles in said casting slip are greater than about 75 microns.

81. The casting slip as recited in claim 79, wherein said casting slip is comprised of from about 8 to about 11 percent of particles greater than 45 microns.

82. The casting slip as recited in claim 81, wherein said casting slip is comprised of from about 3 to about 5 weight percent of particles greater than about 75 microns, and wherein the ratio of the weight percent of said particles greater than about 75 microns in said casting slip divided by the weight percent of said particles greater than about 45 microns in said casting slip is greater than about 0.3.

83. The casting slip as recited in claim 79, wherein said casting slip is comprised of from about 3.5 to about 4.7 percent of particles greater than 75 microns.

84. The casting slip as recited in claim 82, wherein said ratio of the weight percent of said particles greater than about 75 microns in said casting slip divided by the weight percent of said particles greater than about 45 microns in said casting slip is greater than about 0.35.

85. The casting slip as recited in claim 79, wherein said casting slip has a water absorption of less than about 0.5 percent.

86. The casting slip as recited in claim 79, wherein said casting slip has settling index of at least about 0.90.

87. The casting slip as recited in claim 86, wherein said casting slip has a water absorption of less than about 0.5 percent.

88. The casting slip as recited in claim 86, wherein said casting slip has a water absorption of less than about 0.14 percent.

89. The casting slip as recited in claim 88, wherein said casting slip has a settling index of at least about 0.95.

90. The casting slip as recited in claim 60, wherein said casting slip is comprised of silica, at least 50 weight percent of which contains less than about $10^{17}$ Si and Si—O silicon-based radicals per gram.

91. The casting slip as recited in claim 90, wherein at least about 50 weight percent of said silica contains less than about $10^{16}$ Si and Si—O silicon based radicals per gram.

92. The casting slip as recited in claim 90, wherein said casting slip is comprised of at least about 60 weight percent of said silica.

* * * * *